(12) United States Patent
Ignes et al.

(10) Patent No.: US 12,485,967 B2
(45) Date of Patent: Dec. 2, 2025

(54) CARRIER TO REINFORCE A FRAME OF A VEHICLE AND METHOD OF MAKING

(71) Applicant: Zephyros, Inc., Romeo, MI (US)

(72) Inventors: Nuria Ignes, Molsheim (FR); Bill Barz, Romeo, MI (US); Manuel Kesseler, Molsheim (FR)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 18/680,448

(22) Filed: May 31, 2024

(65) Prior Publication Data

US 2024/0351636 A1 Oct. 24, 2024

Related U.S. Application Data

(63) Continuation of application No. 17/615,870, filed as application No. PCT/US2020/036565 on Jun. 8, 2020, now Pat. No. 12,012,149.

(Continued)

(51) Int. Cl.
*B62D 21/15* (2006.01)
*B60K 1/04* (2019.01)
(Continued)

(52) U.S. Cl.
CPC ............... *B62D 21/15* (2013.01); *B60K 1/04* (2013.01); *B62D 25/025* (2013.01); *B62D 25/04* (2013.01);
(Continued)

(58) Field of Classification Search
CPC ...... B62D 25/04; B62D 25/025; B62D 25/06; B62D 25/08; B62D 21/15; B62D 21/157;
(Continued)

(56) References Cited

U.S. PATENT DOCUMENTS 4,018,466 A 4/1977 Norlin
6,467,834 B1 10/2002 Barz et al.
(Continued)

FOREIGN PATENT DOCUMENTS

CN 1608014 A 4/2005
CN 104918847 A 9/2015
(Continued)

OTHER PUBLICATIONS

FR30009708 Text (Year: 2015).*
(Continued)

*Primary Examiner* — Dennis H Pedder
(74) *Attorney, Agent, or Firm* — The Dobrusin Law Firm, P.C.; Daniela M. Thompson-Walters

(57) ABSTRACT

The present teachings generally relate to a carrier and method of making the carrier, the carrier comprising: a periphery having: an outer edge, arranged distally along a transverse axis of the carrier, configured to be oriented away from a frame enclosure of a vehicle, an inner edge, arranged distally along the transverse axis, configured to be oriented toward the frame enclosure of the vehicle, and distal ends arranged opposite each other along a longitudinal axis of the carrier; one or more series of ribs having: a cross-sectional pattern, and an orientation along the longitudinal axis, the transverse axis, or both.

19 Claims, 11 Drawing Sheets

Related U.S. Application Data

(60) Provisional application No. 62/858,615, filed on Jun. 7, 2019.

(51) Int. Cl.
*B62D 25/02* (2006.01)
*B62D 25/04* (2006.01)
*B62D 25/06* (2006.01)
*B62D 25/08* (2006.01)
*B62D 29/04* (2006.01)

(52) U.S. Cl.
CPC .............. *B62D 25/06* (2013.01); *B62D 25/08* (2013.01); *B62D 29/043* (2013.01); *B62D 29/046* (2013.01); *B60Y 2306/01* (2013.01)

(58) Field of Classification Search
CPC .. B62D 29/001; B62D 29/002; B62D 29/005; B60R 19/18; B60R 19/34; B60R 2019/1866; B60R 2019/264
USPC ......... 296/209, 193.06, 210, 23.01, 3, 4, 24; 293/133; 188/371, 376, 377
See application file for complete search history.

(56) References Cited

U.S. PATENT DOCUMENTS

| | | | |
|---|---|---|---|
| 6,935,681 B2 | 8/2005 | Hasler et al. | |
| 7,673,930 B2 | 3/2010 | Stratman | |
| 8,020,924 B2 | 9/2011 | Niezur et al. | |
| 8,322,780 B2 * | 12/2012 | Nagwanshi | B62D 29/005 296/187.03 |
| 8,361,589 B2 | 1/2013 | Kraushaar | |
| 8,366,181 B2 | 2/2013 | Belpaire | |
| 8,388,037 B2 | 3/2013 | LaNore et al. | |
| 9,592,858 B2 | 3/2017 | Kraushaar | |
| 9,771,109 B2 | 9/2017 | Nagwanshi et al. | |
| 10,173,727 B2 | 1/2019 | Li et al. | |
| 10,196,097 B2 | 2/2019 | Richardson et al. | |
| 2004/0224108 A1 | 11/2004 | Sheldon et al. | |
| 2008/0138586 A1 | 6/2008 | Mooiiman et al. | |
| 2009/0091157 A1 | 4/2009 | Niezur et al. | |
| 2010/0015427 A1 | 1/2010 | Belpaire et al. | |
| 2010/0092733 A1 | 4/2010 | Blank et al. | |
| 2010/0253004 A1 | 10/2010 | Lehmann et al. | |
| 2011/0049323 A1 | 3/2011 | Belpaire et al. | |
| 2011/0189428 A1 | 8/2011 | Belpaire et al. | |
| 2011/0206890 A1 | 8/2011 | Belpaire et al. | |
| 2011/0236610 A1 | 9/2011 | Belpaire | |
| 2011/0236616 A1 | 9/2011 | Belpaire | |
| 2012/0141724 A1 | 6/2012 | Belpaire et al. | |
| 2012/0207986 A1 | 8/2012 | Belpaire et al. | |
| 2013/0181470 A1 | 7/2013 | LaNore et al. | |
| 2016/0059897 A1 | 3/2016 | Lang | |
| 2016/0229456 A1 | 8/2016 | Boettcher | |
| 2017/0015361 A1 | 1/2017 | Koch | |
| 2017/0210426 A1 | 7/2017 | Gao | |
| 2018/0134320 A1 | 5/2018 | Jeong | |
| 2019/0077462 A1 * | 3/2019 | Yang | B62D 25/025 |

FOREIGN PATENT DOCUMENTS

| | | | |
|---|---|---|---|
| CN | 106132813 A | 11/2016 | |
| CN | 106542002 A | 3/2017 | |
| CN | 106573586 A | 4/2017 | |
| CN | 206501895 U | 9/2017 | |
| CN | 108068885 A | 5/2018 | |
| DE | 102005043698 A1 | 3/2007 | |
| DE | 102014206002 A1 | 10/2015 | |
| DE | 102016223492 B3 | 4/2018 | |
| DE | 202018105172 U1 | 9/2018 | |
| DE | 102017005938 | 12/2018 | |
| EP | 1122153 A3 | 10/2003 | |
| EP | 1759959 A2 | 7/2007 | |
| EP | 1932648 A1 | 6/2008 | |
| EP | 1373053 B1 | 12/2008 | |
| EP | 2019027 A1 | 1/2009 | |
| EP | 1759964 B1 | 2/2009 | |
| EP | 2117909 A1 | 11/2009 | |
| EP | 2121270 A1 | 11/2009 | |
| EP | 2147848 A1 | 1/2010 | |
| EP | 2154052 A1 | 2/2010 | |
| EP | 2159109 A1 | 3/2010 | |
| EP | 2159136 A1 | 3/2010 | |
| EP | 2165919 A1 | 3/2010 | |
| EP | 2183150 A1 | 5/2010 | |
| EP | 2238012 A1 | 10/2010 | |
| EP | 2323891 A1 | 5/2011 | |
| EP | 2331368 A2 | 6/2011 | |
| EP | 2334540 A1 | 6/2011 | |
| EP | 2337728 B1 | 6/2011 | |
| EP | 2463180 A1 | 6/2012 | |
| EP | 2234803 B1 | 10/2012 | |
| EP | 2289769 B1 | 11/2012 | |
| EP | 2289771 B1 | 1/2013 | |
| EP | 2553036 A1 | 2/2013 | |
| EP | 2632769 A1 | 9/2013 | |
| EP | 2401191 B1 | 10/2013 | |
| EP | 3154764 A1 | 4/2014 | |
| EP | 3548320 A1 | 10/2019 | |
| EP | 3609670 A1 | 2/2020 | |
| FR | 3009708 A1 * | 2/2015 | ........... B62D 23/005 |
| FR | 3041580 A1 | 3/2017 | |
| GB | 2421478 A | 6/2006 | |
| JP | 2006168594 A | 6/2006 | |
| JP | 2012126188 A | 7/2012 | |
| KR | 950029056 A | 11/1995 | |
| KR | 20160128334 A | 11/2016 | |
| WO | 2002/074609 A1 | 9/2002 | |
| WO | 2004/094215 A1 | 11/2004 | |
| WO | 2009/049886 A1 | 4/2009 | |
| WO | 2009/080814 A1 | 7/2009 | |
| WO | 2010/018190 A1 | 2/2010 | |
| WO | 2014/111480 A1 | 7/2014 | |
| WO | 2014/113544 A1 | 7/2014 | |
| WO | 2018/017978 A1 | 1/2018 | |
| WO | 2018/022446 A1 | 2/2018 | |

OTHER PUBLICATIONS

International Search Report and Written Opinion mailed Sep. 17, 2020, PCT Application No. PCT/US2020/036565.
First Chinese Office Action dated Aug. 26, 2023, Application No. 202080053587.6.
Chinese Search Report dated Aug. 24, 2023, Application No. 202080053587.6.
Second Chinese Office Action dated Mar. 14, 2024, Application No. 202080053587.6.
Chinese Supplemental Search dated Mar. 12, 2024, Application No. 202080053587.6.
Final Korean Office Action dated May 28, 2024, Application No. 10-2022-7000722.

* cited by examiner

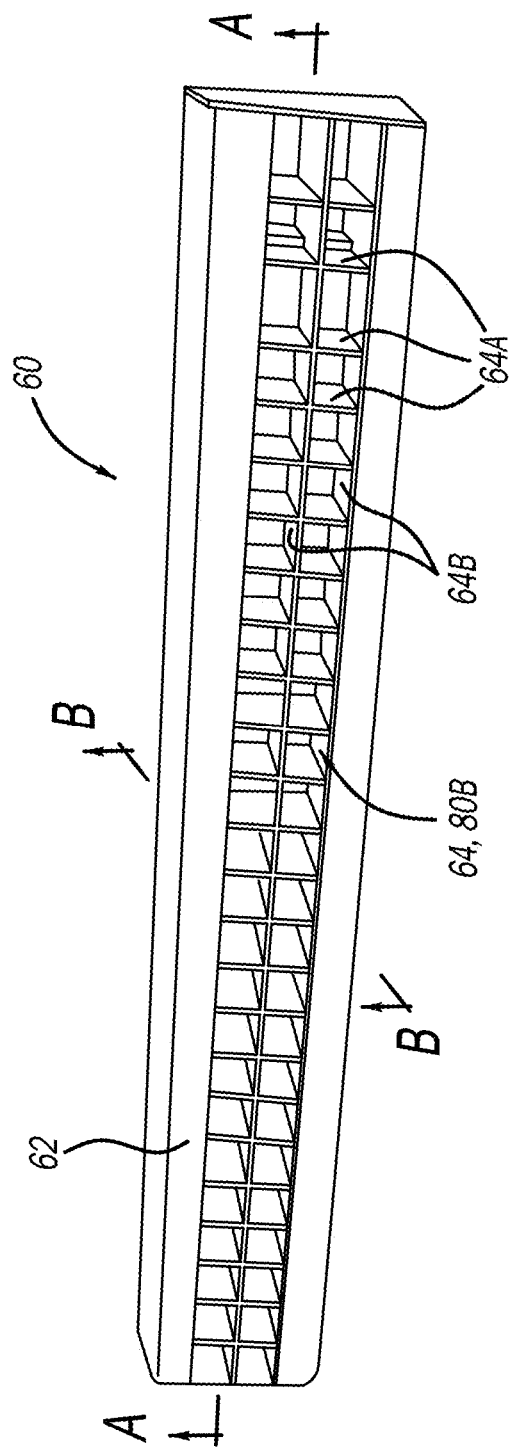

CARRIER TO REINFORCE A FRAME OF A VEHICLE AND METHOD OF MAKING

FIELD

The present teachings generally relate to an apparatus and method for reinforcing a frame of a vehicle. The apparatus and method may be particularly advantageous in providing improved crash-test performance.

BACKGROUND

The use of structural reinforcements for improving the strength of structural frames is generally known. Vehicle frames may be subject to forces resulting from weight of cargo and passengers, uneven road conditions, collisions, or any combination thereof. Rockers and bumper bars are particularly susceptible to side, rear, and front impact.

The proliferation of vehicles with hybrid drive systems and electric drive systems presents new demands for vehicle safety. Damage to batteries can result in fire and possibly explosion, in addition to the costs of replacing a damaged battery after experiencing a collision.

There is a need for structural reinforcements that can be implemented in rockers, bumper bars, or both. There is a need for structural reinforcements that protect drive system batteries. There is a need for structural reinforcements that are lightweight and do not appreciably add to the overall weight of the vehicle. There is a need for structural reinforcements that can be produced by methods enabling various customization options including materials, periphery shape, the arrangement of structural ribs, or any combination thereof.

SUMMARY

The present teachings relates to a carrier comprising: a periphery having: an outer edge, arranged distally along a transverse axis of the carrier, configured to be oriented away from a frame enclosure of a vehicle, an inner edge, arranged distally along the transverse axis, configured to be oriented toward the frame enclosure of the vehicle, and distal ends arranged opposite each other along a longitudinal axis of the carrier; one or more series of ribs having: a cross-sectional pattern, and an orientation along the longitudinal axis, the transverse axis, or both.

The present teachings relates to a carrier to reinforce a frame of a vehicle comprising: a periphery having: an outer edge, arranged distally along a transverse axis of the carrier, configured to be oriented away from a frame enclosure of a vehicle, an inner edge, arranged distally along the transverse axis, configured to be oriented toward the frame enclosure of the vehicle, and distal ends arranged opposite each other along a longitudinal axis of the carrier; one or more series of ribs having: a cross-sectional pattern, and an orientation along the longitudinal axis, the transverse axis, or both; wherein the carrier reduces the intrusion of a crash object upon an occurrence of a collision.

The present teachings relates to a method for producing a carrier to reinforce a frame of a vehicle, the method comprising: extruding, co-extruding, or pultruding one or more base materials, one or more reinforcing materials, or both, to produce: a periphery having: an outer edge, arranged distally along a transverse axis of the carrier, configured to be oriented away from a frame enclosure of a vehicle, an inner edge, arranged distally along the transverse axis, configured to be oriented toward the frame enclosure of the vehicle, distal ends arranged opposite each other along a longitudinal axis of the carrier; one or more series of ribs having: a cross-sectional pattern, and an orientation along the longitudinal axis, the transverse axis, or both.

The present teachings provide for carriers that can be implemented in rockers, bumper bars, or both. The present teachings provide for carriers that protect drive system batteries. The present teachings provide for carriers that are lightweight and do not appreciably add to the overall weight of the vehicle. The present teachings provide for carriers that can be produced by methods enabling various customization options including materials, periphery shape, the arrangement of structural ribs, or any combination thereof.

BRIEF DESCRIPTION OF THE DRAWINGS

FIG. 3 illustrates a perspective, sectional view of a carrier.

DESCRIPTION

Figure 1:
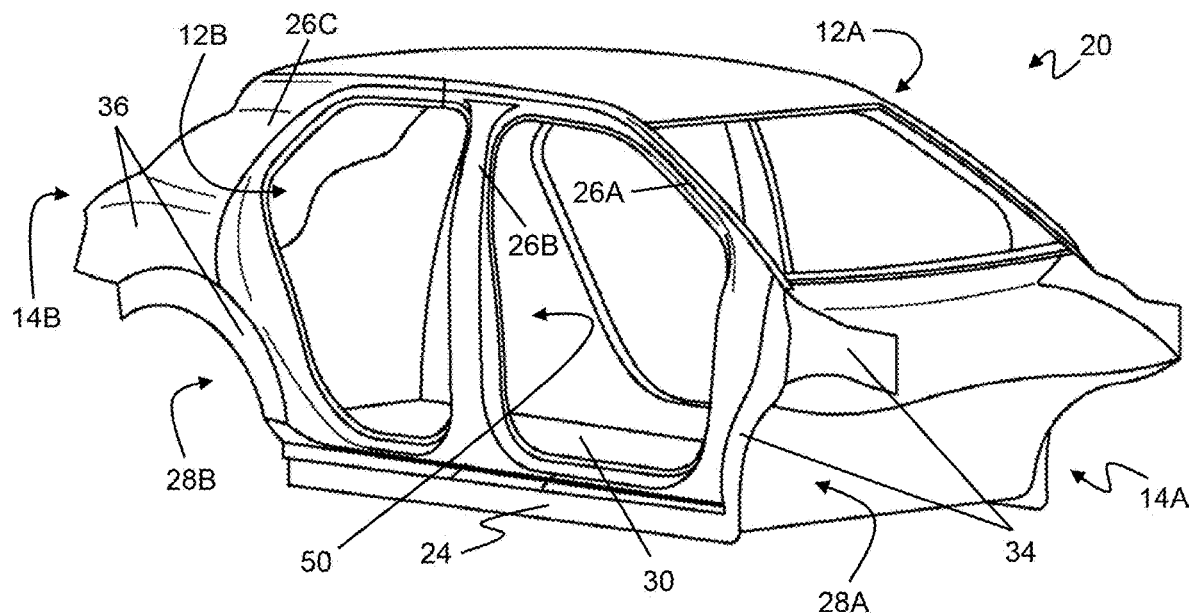
FIG. 1 illustrates a perspective view of a frame.

The present teachings meet one or more of the above needs by the improved apparatus and method described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The vehicle may function to encapsulate and protect passengers upon an impact event (i.e., the vehicle being impacted by another vehicle or an object). The vehicle may be symmetrically divided into a left side (i.e., the driver's side, for vehicles driven in the United States) and a right side and a forward end (i.e., including the front bumper) and a rearward end (i.e., including the rear bumper). The vehicle may be of any conventional body style, including a coupe, a sedan, a station wagon, a hatchback, an SUV, a mid-sized SUV, a sport utility vehicle, a van, a minivan, a pickup truck, or the like. The vehicle may be of any make, model, model year, or any combination thereof. The vehicle may be a gas-powered vehicle, a battery-powered vehicle, or a hybrid vehicle. The vehicle may comprise a frame.

Battery-powered vehicles may include a battery that functions to generate power and deliver the power to drive wheels. The battery may be located in any portion of the vehicle including but not limited to under a floor pan, on top of a floor pan, under a seat, in a luggage compartment, in an engine bay, or any combination thereof. The battery may span a single segment of a vehicle or may span more than one segment of a vehicle. For example, the battery may be substantially planar and extend, under the floor pan, fully from the left side of the vehicle to the right side of the vehicle and fully between the rearward wheel well and the forward wheel well. The battery may be of a lithium ion, a nickel-metal, a lead-acid, or an ultracapacitor variety. The battery may have a tendency to catch fire or explode during a crash event in which the battery is directly contacted or punctured by a crash object, crushed or punctured by adjacent frame components, jostled by impact forces, or any combination thereof. For example, damage to a lithium-ion battery may cause the positive electrode to be exposed to direct contact with the negative electrode, causing a short circuit that may result in a temperature increase sufficient to cause a fire.

The frame may function: as the structural framework of the vehicle, to accept components of the vehicle (e.g., engine, drivetrain, doors, seats, and the like), to absorb forces from an impact event, to prevent intrusion of crash objects (e.g., vehicles, sign posts, poles, concrete dividers, and the like), to protect passengers, to protect vehicle components (e.g., engine or batteries), or any combination thereof. The frame may be of a unibody style or a body-on-frame style. The frame may include any conventional frame components including but not limited to: front aprons, quarter panels, A-pillars, B-pillars, C-pillars, sills, rockers, bumper beams, floor pans, cross-members, or any combination thereof. The frame may define a frame enclosure, a forward wheel well (i.e., in the forward end of the vehicle), a rearward wheel well (i.e., in the rearward end of the vehicle), or any combination thereof.

The frame enclosure may function to encapsulate vehicle passengers and components of the vehicle (e.g., engine, seats, batteries, electronics, etc.). The frame enclosure may be defined by surrounding components of a frame. For example, a passenger compartment may be a substantially trapezoidal prism shape defined by A-pillars to the front, B-pillars to the rear, a floor pan on the bottom, and roof rails and roof bows on the top. The frame enclosure may include passenger compartments, battery trays, seats, or any combination thereof.

The passenger compartments may function to house a single passenger. The frame enclosure may include two or more, four or more, ten or less, or even eight or less passenger compartments. For example, a two-seat vehicle may have a passenger compartment on the left side of the vehicle and a passenger compartment on the right side of the vehicle. As another example, a four-seat vehicle may have two passenger compartments on the left side of the vehicle, one adjacent the forward wheel well and one adjacent the rearward wheel well, and two passenger compartments on the right side of the vehicle, one adjacent the forward wheel well and one adjacent the rearward wheel well.

The battery tray may function to secure a battery in place, encapsulate a battery, provide a protective barrier for the battery or any combination thereof. The battery tray may be located within the frame enclosure or proximate to the frame enclosure (e.g., under and adjacent to a floor sub-frame). The battery tray may be located within or proximate to a discrete passenger compartment or may span more than one passenger compartment. For example, the battery tray may be located under a seat of a passenger compartment adjacent the rearward wheel well. As another example, the battery tray may and may span the left passenger compartment and the right passenger compartment of the vehicle. The battery tray may sit atop a floor tray or be fastened to the frame under a floor tray or perhaps be fastened to any other frame component. The battery tray may comprise a single component or multiple components. A single component battery tray may fasten to a frame of the vehicle to form an enclosure (e.g., a single component fastened to the underside of the floor tray whereby the battery is fully encapsulated between the floor tray and the single component). The constituent parts of multiple component battery trays may form a complementary fit and encapsulate the battery. The battery tray may also house components typically found in electric drive systems including but not limited to heaters, controllers, insulation, a junction box, or any combination thereof.

The front apron may be a body panel between a front door of the vehicle and the forward end. The front apron may extend vertically from a hood of the vehicle to the rocker. The front apron may extend horizontally from a front door of the vehicle to the forward end. The front apron may define a forward wheel well.

The quarter panel may be a body panel between a rear door of the vehicle and the rearward end. The quarter panel may extend vertically from a rear window of the vehicle to the rocker. The quarter panel may extend horizontally from the rear door of the vehicle to the rearward end. The quarter panel may define a rearward wheel well.

The A-pillars, B-pillars, C-pillars, or any combination thereof ("pillars") may function to support the roof of the vehicle, the doors of the vehicle, the windows of the vehicle, or any combination thereof. The pillars may be employed as complementary pairs, one on each of the left side and right side of the vehicle. The A-pillars may extend upward (i.e., toward the roof of the vehicle) and at an angle from the front apron, toward the roof of the vehicle. The B-pillars may extend upward from sills, toward the roof of the vehicle. The B-pillar may extend at an angle from or may be substantially perpendicular to the sills. The vehicle may include more than one pair of B-pillars where the vehicle includes more than two sets of doors. The C-pillars may extend upward and at an angle from the quarter panel, toward the roof of the vehicle. Complementary left-side and right-side pillars may substantially define the boundaries of the passenger compartments. For example, two adjacent passenger compartments may be located between the A-pillars and the B-pillars and two more adjacent passenger compartments may be located between the B-pillars and the C-pillars.

The sills may function to reinforce the bottom of the vehicle to prevent sagging and intrusion into the frame enclosure upon the occurrence of a collision. The sills may include two sills, one on the left side and one on the right side of the vehicle. The sills may include two longitudinally distal ends that span the length between the forward wheel well (i.e., forward distal end) and the rearward wheel well (i.e., rearward distal end). The forward distal end may be coupled to a front apron and the rearward distal end may be coupled to the quarter panel. Extending between the sill on the left side and the sill on the right side may be a floor pan (i.e., providing a base for and supporting the weight of any person or object contained in the frame enclosure and said weight may be transmitted to the sills). The sills may be configured to resist bending from vertical forces (e.g., the weight of gravity of the vehicle roof transmitted through the B-pillar to the sill) and horizontal forces (e.g., a horizontal force vector from a side impact). The sills may be shaped so that the sills resist bending stress from more than one direction. For example, the sill may be L-shaped so that the sill may resist bending stress directed onto the distal ends of each leg of the L-shape.

The rockers may function to enhance the strength of the sills, protect the sills from corrosion, protect the sills from impact, provide an aesthetic covering for the sills, or any combination thereof. The rockers may include two rockers, one employed on the sill of the left side and one employed on the sill of the right side. The rockers may be configured to form a complementary fit with the sills. The rockers may include a flange that is configured to abut substantially flush to the sills. The rockers may be fastened to the sills via welding, fasteners, or both. The rockers may form a removable connection to the sills so that they may be replaced (e.g., upon impact damage or corrosion), carriers may be introduced, or both. The rockers may comprise polymer, metal, or both. The mating of a rocker with a sill may result in the formation of a cavity, which may be suitable to house a carrier. The rockers may be configured to be the initial contact interface of a collision object upon the occurrence of an impact event.

The bumper beams may function to reinforce the forward end of the vehicle, the rearward end of the vehicle, or both. The bumper beam may be configured to resist intrusion of a crash object into the engine compartment of the vehicle, the luggage compartment of the vehicle, or both. The bumper beams may be located behind the rear bumper (i.e., body panel) and front bumper (i.e., body panel). The bumper beams may comprise polymer, metal, or both. The bumper beams may be a shaped component affixed to the forward end, the rearward end, or both. The bumper beams may include a cavity, trough, or both, which may be suitable to house a carrier. The bumper beams may include a face outwardly oriented away from the frame enclosure, the face including one or more flat segments, one or more curved segments, or both. The face may be configured to be the initial contact interface of a collision object upon the occurrence of a collision.

The carrier may function to reinforce the vehicle frame, absorb energy from a collision, spread energy from a collision over a wider geometry, provide a rigid backbone resistant to buckling, or any combination thereof. The carrier may be employed in a frame of a vehicle. Particularly, the carrier may be employed in rockers, bumper beams, or both. The carrier may have a substantially uniform or non-uniform cross-sectional geometry along a longitudinal axis (i.e., extending centrally through the longest portion of the carrier and oriented substantially parallel to the sill). The carrier may have a substantially uniform or non-uniform cross-sectional geometry along any transverse axis (i.e., any axis perpendicularly intersecting the longitudinal axis and not limited to any radial orientation). For example, the carrier may have a rectangular cross-section along a transverse axis (i.e., uniform cross-sectional geometry) or may be have an L-shaped cross-section along a transverse axis (i.e., non-uniform cross-sectional geometry). The geometry along the longitudinal axis and the transverse cross-section may substantially correspond with the geometry of the sills, the rockers, the bumper beams, or both, which may be distinct for the make, model, or year of the vehicle. The carrier may include an outer edge, configured to be oriented facing away from the frame enclosure, an inner edge, configured to be oriented toward the frame enclosure, or both. The carrier may include a top edge (i.e., configured to face the roof of the vehicle) and a bottom edge (i.e., configured to face toward the ground), extending between the inner edge and the outer edge. The carrier may include a rearward cap, a forward cap, or both, located at the longitudinally distal ends of the carrier and configured to be oriented adjacent the rearward wheel well and the forward wheel well respectively. The longitudinal length of the carrier may span the entirety of the rocker or may have a length less than that of the rocker. For example, the carrier may extend merely a length corresponding to a length of a side of the battery tray (i.e., employed specifically for the reinforcement of the battery tray). The carrier may comprise one or more base materials, one or more reinforcement materials, one or more additives, or any combination thereof. The carrier may include, a periphery, ribs, activatable material, or any combination thereof.

The periphery may function to enclose the ribs. The periphery may have transverse cross-section geometry that is circular, triangular, quadrilateral, pentagonal, hexagonal, amorphous, or any combination thereof. The cross-sectional geometry may fit, at least in part, complementary to the sill, the rocker, or both. For example, the cross-sectional geometry may form a substantially complementary fit with a rectangular trough in the rocker. The periphery may not span the full longitudinal or transverse extent of the carrier, which may provide for an overall reduction in the volume of material, reducing manufacturing complexity, weight savings, cost savings, or any combination thereof. The periphery may extend the longitudinal or transverse extent of the carrier or may be confined to segments along the longitudinal or transverse extent of the carrier. For example, the periphery may only be present on an outer edge of the carrier and an inner edge of the carrier and may not be present on the top and bottom edge of the carrier (i.e., exposing the one or more ribs), which may provide for a reduction in amount of material needed to produce the carrier. The periphery may include voids in portions of the inner edge, outer edge, top edge, bottom edge, rearward cap, forward cap, or any combination thereof. The voids may be formed on a portion of the periphery where the ribs do not interface with the interior of the periphery. For example, the periphery may include voids in the form of a thin strip along the outer edge, inner edge, top edge, bottom edge, or any combination thereof. The periphery may include an interior surface, which interfaces with the ribs, and an exterior surface on the opposing side to the interior surface. The periphery may have a thickness (i.e., the extent between the interior surface and the exterior surface) of about 0.5 cm to about 2 mm. The exterior surface of the periphery may be textured. For example, the exterior surface may include divots extending a depth into the periphery and projecting along the longitudinal axis of the carrier.

The one or more series of ribs may function to absorb energy and protect the frame from deformation resulting from an impact event. The ribs may inhibit bending, torsion, or both. The one or more series of ribs may project from and extend between one or more interior surfaces of the periphery. Each of the one or more series of ribs may include one or more ribs. The one or more series of ribs may extend between adjacent, perpendicular surfaces of the periphery, opposing, parallel surfaces of the periphery, or both. The one or more series of ribs of a single series may be oriented parallel to each other. One or more series of ribs of discrete series may intersect each other. One or more series of ribs of discrete series may intersect each other at any angle. One or more series of Ribs of discrete series may intersect some ribs of another series but not all. For example, a first series of ribs comprising six ribs may project from and extend between the top edge and the bottom edge and a second series of ribs may project from the inner edge, perpendicular to the orientation of the first series of ribs, and only extend to the fourth rib of the first series of ribs (i.e., not extending fully to the outer edge). The ribs may have a thickness of about 0.5 mm to about 2 cm. The ribs may be configured with a cross-sectional pattern and orientation. The ribs may include a rigid portion, a ductile portion, or both.

The activatable material may function to provide baffling, sealing, structural reinforcement, or any combination thereof. The carrier may be used with or without the activatable material. The activatable material, after curing, may span a cavity of a structure (e.g., area between rocker and sill). The activatable material may be activated to cure, expand (e.g., foam), soften, flow or any combination thereof. The activatable material may be directly dispensed upon and typically adhered to the periphery of the carrier. The activatable material may cover a substantial portion (e.g., at least 40%, 60%, 80% or more) of the surface area of the periphery of the carrier. A variety of activatable materials may be used in conjunction with the carrier. The activatable material may be formed of a heat-activated material and may flow, cure (e.g., be thermosettable), foam, or any combination thereof, upon exposure to heat. The activatable material may be generally dry to the touch and substantially non-tacky or may be tacky and, in either situation, may be shaped in any form of desired pattern, placement, or thickness, but is preferably of substantially uniform thickness. Exemplary heat-activated activatable materials include L-5520, L-5505, L-5540, L-5905, L-5920, L-5904, L-5235, L-5236, and L-5244 foams, commercially available through L&L Products, Inc. Another exemplary activatable material is disclosed in U.S. Pat. No. 7,199,165, incorporated herein by reference for all purposes.

The cross-sectional pattern may be defined by the cross-sectional shape produced by the ribs whereby the cross-section is a longitudinal cross-section of the carrier or a transverse cross-section of the carrier. The cross-sectional pattern may be a biased pattern, a rectangular pattern, a honeycomb pattern, a hybrid pattern, or any combination thereof. The cross-sectional pattern may be defined by a spatial arrangement, angular arrangement, or both, of one or more series of ribs. The cross-sectional pattern may include one or more cross-sectional patterns in a single carrier. For example, a biased pattern may span across one half the carrier and a rectangular pattern may span across the other half of the carrier. The cross-sectional pattern may extend across the entire span of the cross-section of the carrier or may span across only a portion of the cross-section of the frame. For example, one or more series of ribs forming a cross-sectional pattern may only be present on one cross-sectional half of the carrier but not the other cross-sectional half of the carrier. The cross-sectional pattern may be a uniform dimension across the entire span of the cross-section of the carrier or may be a non-uniform dimension across only a portion of the cross-section of the carrier. For example, the carrier may comprise a rectangular pattern whereby one cross-sectional half of the carrier includes rectangular segments of a first dimension and the other cross-sectional half of the carrier includes rectangular segments of a second dimension (e.g., half the width of the first dimension).

The biased pattern may be an arrangement of the one or more series of ribs angularly biased from the rearward cap, the forward cap, or the periphery. The angular bias of the one or more series of ribs may be equal and opposite (e.g., −25° and +25°) or asymmetric (e.g., −25° and +15°).

The rectangular pattern may be an arrangement of the one or more series of ribs parallel to the rearward cap, the forward cap, or the periphery. The rectangular pattern may be a first of the one or more series of ribs is perpendicular to a second of the one or more series of ribs.

The honeycomb pattern may be an arrangement of one or more series of ribs comprising: a first series of ribs having a symmetrical zigzag pattern: a second series of ribs having a symmetrical, zigzag pattern, the second series of ribs having reflection symmetry with respect to the first series of ribs; and a third series of ribs parallel to the rearward cap, the forward cap, or the periphery, and extending from peaks formed by the zigzag patterns of the first series of ribs and second series of ribs.

The hybrid pattern may be an arrangement of one or more series of ribs according to a combination of the biased pattern, rectangular pattern, honeycomb pattern, or any combination thereof. For example, the ribs may include: a first series of ribs arranged vertically (i.e., rectangular pattern), a second series of ribs arranged horizontally (i.e., rectangular pattern), and a third series of ribs arranged at a bias from vertical (i.e., biased pattern). As another example, injection molding may provide for a honeycomb pattern projecting along a transverse axis of the carrier and a rectangular pattern projecting along a longitudinal axis of the carrier, perpendicularly intersecting the honeycomb pattern (i.e., the rectangular pattern comprising a single rib formed by the space between two halves of an injection mold).

The orientation may be defined by the cross-sectional orientation of the pattern. The orientation may be longitudinal, transverse, or angled. The longitudinal orientation may be defined by the cross-sectional orientation of the pattern extending in parallel to the longitudinal axis of the carrier and the ribs projecting along a transverse axis of the carrier. The transverse orientation may be defined by the cross-sectional orientation of the pattern extending in parallel to a transverse axis of the carrier and the ribs projecting along a longitudinal axis of the carrier. The angled orientation may be defined by the cross-sectional orientation of the pattern extending at a bias from the longitudinal axis of the carrier, the transverse axis of the carrier, or both.

The rigid portion may function to withstand bending of the carrier. The rigid portion may comprise one or more base materials that exhibit sufficient rigidness in a virgin state; one or more base materials having rigidness imparted or enhanced by filling with one or more reinforcement materials; or both. The rigid portion may be located on the entirety of: a single rib in a single series, multiple ribs in a single series, one or more series of ribs, or the periphery. The rigid portion may be located on portions of: a single rib in a single series, multiple ribs in a single series, one or more series of ribs, or the periphery. The rigid portion may include an entire carrier.

The ductile portion may function to deform and thereby absorb energy. The ductile portion may comprise one or more base materials that exhibit sufficient ductility in a virgin state; one or more base materials having ductility imparted or enhanced by filling with one or more reinforcement materials; or both. The ductile portion may be located on the entirety of: a single rib in a single series, multiple ribs in a single series, one or more series of ribs, or the periphery. The ductile portion may be located on portions of: a single rib in a single series, multiple ribs in a single series, one or more series of ribs, or the periphery. The ductile portion may include an entire carrier.

In some applications, two or more carriers may be employed for a single rocker of a vehicle. The two or more carriers, individually, may comprise both rigid and ductile portions or the entirety of each of the two or more carriers are rigid or ductile (i.e., "a rigid carrier" or "a ductile carrier"). A rigid carrier and a ductile carrier may be employed in combination in order to obtain enhanced crash test performance. For example, a ductile carrier may be employed on a side of a rocker facing away from the vehicle and a rigid carrier may be adjacently employed on a side of the rocker facing toward the vehicle; the ductile carrier may be configured to absorb the initial forces of the impact and reduce the amount of force eventually transmitted to the rigid portion; the rigid portion may be configured to resist buckling (i.e., bending stress). Any combination of any number of rigid carriers, ductile carriers, or both may be employed. For example, the rocker may be filled with a horizontally adjacent stack of: a first ductile carrier, a first rigid carrier, a second ductile carrier, and a second rigid carrier.

Where two or more carriers are employed, the carriers may comprise one or more ribs having differing cross-sectional patterns and orientations. For example, a carrier having ribs with a rectangular pattern and a longitudinal orientation may be employed in conjunction with a carrier having ribs with a honeycomb pattern and a transverse orientation. One or more carriers may comprise ribs having any cross-sectional pattern and orientation as described herein. Utilization of two or more carriers may enable the combination of homogenous carriers, composite carriers or both. For example, a homogenous carrier comprising steel may be paired with a composite carrier comprising glass fibers and polyamide. Employing two or more carriers having different compositions of base materials, reinforcing materials, or both may result in material combinations and thus properties not conventionally achievable in the manufacturing of a single carrier.

Where two or more carriers are employed, the carriers may or may not be fastened together. The carriers may be fastened by adhesive, welding, or fasteners.

The ribs, periphery, or both may comprise a composite of one or more base materials, one or more reinforcing materials, or both. The composite may be layered or homogenous. Layered composites may comprise two or more discrete layers and each of the discrete layers may be rigid, ductile, or both. The layers may comprise, adhesives, sealants, tapes, or other materials for connecting the composite layers. Such adhering and/or sealing materials may also be arranged so that a more ductile material is arranged adjacent a more rigid and/or brittle (e.g., less ductile) material. For example, via a co-extrusion process, a less rigid polymer (e.g., polyethylene) may be layered with a more rigid polymer (e.g., polyamide). And a less rigid adhesive may be layered with a more rigid one. Uniformly dispersed composites may comprise two or more constituents that are present substantially uniformly throughout the ribs, periphery, or both. For example, via a pultrusion process glass fibers may be coated with a polymer (e.g., polyamide) to result in a uniform distribution of glass fibers within the polymer.

The carrier may comprise one or more base materials. The carrier may comprise polymer, metal, or both. The polymer may include polyamide ("PA"), polyvinyl chloride ("PVC") polyetherimide ("PEI"), polycarbonate ("PC"), poly(methyl methacrylate) ("PMMA"), acrylonitrile butadiene styrene ("ABS"), polyetherketoneketone ("PEKK"), polyaryletherketone ("PAEK"), polyether ether ketone ("PEEK"), polyphenylene sulfide ("PPS"), polyethylene terephthalate ("PET"), polypropylene ("PP"), polyethylene ("PE"), or any combination thereof. The metal may include aluminum, steel, brass, magnesium, zinc, titanium, metal alloy, or any combination thereof. The one or more base materials may be present in an amount of about 1% to about 70% by weight of the carrier. The carrier may comprise a single base material (i.e., a homogenous carrier) or more than one base material (i.e., a composite carrier).

The one or more reinforcing materials may function to enhance the properties of the carrier such as improve tensile strength, improve flexural strength, distribute energy within the reinforcement, or any combination thereof. The reinforcing materials may include mineral reinforcement, glass reinforcement, carbon reinforcement, polymeric reinforcement, elastomeric reinforcement, core-shell polymer, or any combination thereof. The one or more reinforcing materials may be present in an amount of about 0% to about 70% by weight of the carrier.

The mineral reinforcement may be any suitable silicate minerals including but not limited to inosilicates (e.g., Wollastonite) and phyllosilicates (e.g., Kaolinite, Vermiculite, Talc, Muscovite, etc.); diatomaceous earth; clay (e.g., nanoclay); silica; calcium; or any combination thereof. The characteristic external shape of an individual crystal or crystal group of the silicate minerals may be acicular or needle-like. The median particle size of the silicate minerals may be from about 10 microns to about 20 microns. The median particle size may be from about 12 microns to about 18 microns.

The glass reinforcement may be chosen from glass fibers, glass beads, or glass bubbles ("microspheres"). The glass reinforcement may include alumino-borosilicate glass ("E-glass"), alkali-lime glass ("A-glass" or "C-glass"), electrical/chemical resistance glass ("E-CR-glass"), borosilicate glass ("D-glass"), alumino-silicate glass ("R-glass" or "S-glass"), or any combination thereof. The glass reinforcement may be chopped fiber. The glass reinforcement may be a fiber chopped to a length of about 0.1 cm or more, about 0.3 cm or more, or even about 0.6 cm or more. The glass reinforcement may be a chopped length of about 2.0 cm or less, about 1.5 cm or less, or even about 1.0 cm or less.

The carbon reinforcement may include carbon fibers or woven fabrics. The carbon reinforcement may be 1K, 2K, 3K, 4K, 5K, or even 6K (i.e., 1K denotes 1000 fiber filaments in one bundle).

The polymeric reinforcement may include fibers of polyamides (e.g. nylon, polyamide, polypthalamides, or aramids), polypropylene ("PP"), polyurethane ("PUR"), poly-vinyl-chloride ("PVC"), acrylonitrile butadiene styrene ("ABS"), polystyrene ("PS"), polyethylene ("PE"), polyoxymethylene ("POM"), polycarbonate ("PC"), acrylic ("PMMA"), polybutylene terephthalate ("PBT"), polyethylene teraphthalate ("PET"), acrylonitrile styrene acrylate ("ASA"), or any combination thereof. The polymeric reinforcement may be a fiber with an aspect ratio of from about 20:1 to about 3:1.

The elastomeric reinforcement may include natural rubber, styrene-butadiene rubber ("SBR"), polyisoprene, polyisobutylene, polybutadiene ("PBd"), isoprene-butadiene copolymer, neoprene, nitrile rubber (e.g., a butyl nitrile such as carboxy-terminated butyl nitrile), butyl rubber, carboxyl-terminated polymer, (e.g. carboxyl functional butadiene-acrylonitrile), carboxyl-terminated polymer (e.g. carboxyl functional butadiene-acrylonitrile), polydisulfide polymer, acrylic elastomer, acrylonitrile elastomers, silicone rubber, polysiloxanes, polyester rubber, diisocyanate-linked condensation elastomer, ethylene-propylene diene rubbers ("EPDM"), chlorosulphonated polyethylene, fluorinated hydrocarbons, or any combination thereof.

The core-shell polymer may comprise a first polymeric material (i.e., core material) and a second polymeric material (i.e., shell material). The first polymeric material may be substantially or entirely encapsulated by the second polymeric material. The shell material may be grafted onto the core material. The first polymeric material may be present in the amount of about 30% or more, 50% or more, or even 70% or more by weight of the core-shell polymer. The first polymeric material, the second polymeric material, or both may comprise one, two, three, or even more than three polymers that are combined together, reacted together (e.g., sequentially polymerized), or both, or may be part of separate or the same core-shell polymer systems. The core-shell polymer preferably has a ductile core and a rigid shell. The shell material may have favorable adhesion with the other components of the carrier. The core-shell polymer may have a particle size of about 50 nm to about 300 nm.

Examples of shell materials include but are not limited to styrene, acrylonitrile, alkyl acrylates (e.g., methyl acrylate, methyl methacrylate), vinyl acetate, vinyl chloride, or any combination thereof.

Examples of core materials include but are not limited to polybutadiene ("PBd"), butyl acrylate, ethyl isobutyl, alkyl acrylates (e.g., 2-ethylhexyl), or any combination thereof. The core material may include copolymers (e.g., styrene, vinyl acetate, methyl methacrylate, butadiene, or isoprene). The core material may include cross-linking monomers (e.g., ethylene glycol diacrylate or butylene glycol dimethacrylate). The core material may include graft linking monomers (e.g., diallyl maleate or allyl methacrylate).

The carrier may include one or more additives. The one or more additives may include blowing agents, blowing accelerators, curing agents, curing accelerators, fillers, pigments, or any combination thereof.

The carrier may be produced by methods including injection molding, extrusion, co-extrusion, pultrusion, or any combination thereof.

The carrier may be produced via injection molding. Injection molding may be suitable for the production of homogenous carriers or composite carriers. Homogenous carriers may be obtained by the injection molding of one base material. Composite carriers may be obtained by the injection molding of one or more base materials with one or more reinforcing materials, or two or more base materials. The injected material may be a uniform mixture of one or more base materials with one or more reinforcing materials. For example, polyamide may be mixed with glass fiber reinforcement prior to injection into a mold. As another example, a single cylinder may deliver a first base material to the mold cavity and thereafter may deliver a second base material into the mold cavity resulting in the first base material being pushed to the periphery of the mold cavity by the second base material and as a result the second base material may be situated in a proximal area of the mold cavity (i.e., layered distribution). As another example, a dual cylinder system may involve a first cylinder delivering a first base material to one distal end of a mold cavity while a second cylinder delivers a second base material to the other distal end of the mold cavity, resulting in a substantially bisectional distribution of the first base material and the second base material (i.e., sectional distribution). Any combination of the above-described techniques may be employed in order to obtain a carrier having any combination of one or more base materials, one or more reinforcing materials, or both in a variety of layered distributions, sectional distributions, or both.

Injection molding may be suitable for obtaining a carrier lacking a portion of or the entirety of an inner edge, an outer edge, a top edge, a bottom edge, a rearward cap, a forward cap, or any combination thereof, as a result of the axial removal of the carrier from the mold. Injection molding may be suitable for obtaining a carrier with ribs having a longitudinal orientation or a transverse orientation. The ribs may be biased an angle (i.e., draft angle) from the axis in which the carrier is removed from the mold so that the carrier may be easily removed from the mold. Injection molding may be suitable for the production of a carrier having a single rib oriented perpendicular to another series of ribs.

The carrier may be produced via extrusion. Extrusion may be suitable for the production of homogenous or composite articles. Extrusion may provide for a continuous piece that exits a die and may thereafter be cut to length to form an individual carrier. Homogenous articles may be obtained by the extrusion of one base material. For example, the carrier may be obtained by extruding aluminum. Composite articles may be obtained by the extrusion of one or more base materials with one or more reinforcing materials. The extruded material may be a uniform mixture of one or more base materials with one or more reinforcing materials. For example, polyamide may be mixed with glass fiber reinforcement prior to extrusion. The extruded material may be a combination of two or more base materials. For example, a first material and a second material may be fed into a flow channel before exiting through the die (i.e., co-extrusion), which may result in a carrier having a sectional distribution of the first material and the second material. Co-extrusion may be utilized to obtain one or more, two or more, eight or less, or even seven or less layers of base material. Any combination of the above-described techniques may be employed in order to obtain a carrier having any combination of one or more base materials, one or more reinforcing materials, or both in a variety of layered distributions, sectional distributions, or both.

Extrusion may be suitable for a obtaining a carrier lacking a portion of or the entirety of an inner edge, an outer edge, a top edge, a bottom edge, a rearward cap, a forward cap, or any combination thereof, as a result of the movement of the carrier through the die. Particularly, extrusion may be suitable for producing ribs having a transverse orientation and a carrier lacking a rearward cap, a forward cap, or both.

The carrier may be produced via pultrusion. Pultrusion may be suitable for the production of composite articles. Pultrusion may provide for a continuous piece that exits a die and may thereafter be cut to length to form an individual carrier. Pultrusion may be utilized in conjunction with roving, fabrics (e.g., unidirectional, woven, multiaxial, or random orientation (chopped strand mat)), or films. Pultrusion may involve feeding one or more base materials, one or more reinforcement materials, or both through an impregnation bath of one or more base materials before forming the materials via a die. For example, glass fiber roving may be fed through an impregnation bath of polyamide and thereafter guided through a die having cantilevered mandrels, which form the voids between the ribs. As another example, steel wire may be fed through an impregnation bath of polyamide and thereafter guided through a die having cantilevered mandrels, which form the voids between the ribs. Any combination of the above-described techniques may be employed in order to obtain a carrier having any combination of one or more base materials, one or more reinforcing materials, or both in a variety of layered distributions, sectional distributions, or both.

Pultrusion may be suitable for a obtaining a carrier lacking a portion of or the entirety of an inner edge, an outer edge, a top edge, a bottom edge, a rearward cap, a forward cap, or any combination thereof, as a result of the movement of the carrier through the die. Particularly, pultrusion may be suitable for producing ribs having a transverse orientation and a carrier lacking a rearward cap, a forward cap, or both.

The carrier may include a first portion formed by an injection molding process and a second portion formed by a pultrusion process. The pultrusion process may utilize a first polymer which may be a polyurethane material. The first portion may be injection molded (e.g., overmolded) around the second portion. Alternatively, the first portion may be mechanically or adhesively fastened to the second portion. The first portion may be formed as a single unitary construction, or may be formed by multiple pieces. The multiple pieces may be adhesively or mechanically attached to the second portion. The second portion may be formed as a unitary insert. The insert may have a substantially u-shaped or rectangular profile. The first portion may include one or more ribs structures the one or more rib structures may be formed substantially perpendicular to the longitudinal axis of the carrier. The one or more rib structures may extend along the entirety of the carrier. The second portion may be substantially surrounded by the one or more rib structures, forming a line of rib structures on at least two sides of the insert. An adhesive may be located onto one or more of the first portion or second portion. The adhesive may be applied by an inline process. The adhesive material may be extruded onto the carrier. The carrier may replace an aluminum rocker, providing reinforcement that is comparable to that of the aluminum but at significantly less weight than the aluminum rocker. The carrier may be located within a vehicle cavity.

The performance of the carrier of the present disclosure may be determined and compared by implementing a crash test. The crash test may be simulated (i.e., via computer modeling) or live (i.e., with an actual vehicle). The crash test may subject a test vehicle to a collision with a crash object (e.g., a pole) whereby the crash object is stationary and the vehicle moves toward the crash object or vice versa, at a fixed velocity. Intrusion may be the entry of a crash object into the body of the vehicle and displacement may be the measurable extent of intrusion (i.e., distance between a distal plane of the pre-impacted vehicle and a plane tangential to the furthest point of intrusion). Performance may be determined by the peak displacement of the crash object (i.e., point of furthest intrusion), the fixed-force displacement (i.e., point of furthest intrusion at a given measurable force), or both. Peak intrusion may not correspond to the intrusion at a time when the vehicle or the crash object are no longer in motion, due to the elasticity of the vehicle, the crash object, or both. Measuring the fixed-force displacement may provide a meaningful comparison between two test examples (e.g., inventive example and comparative example) because the peak force between two test examples may vary due to variable force absorbing properties (e.g., a vehicle employing a carrier may register a lower peak force as compared to a vehicle without a carrier).

Figure 2:
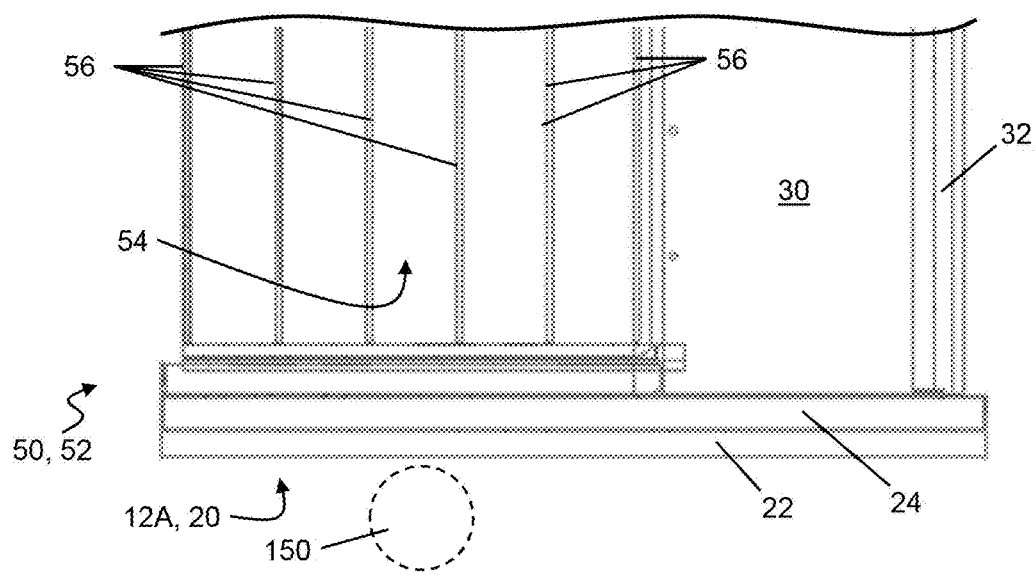
FIG. 2 illustrates a plan view of a driver compartment.
Figure 6:
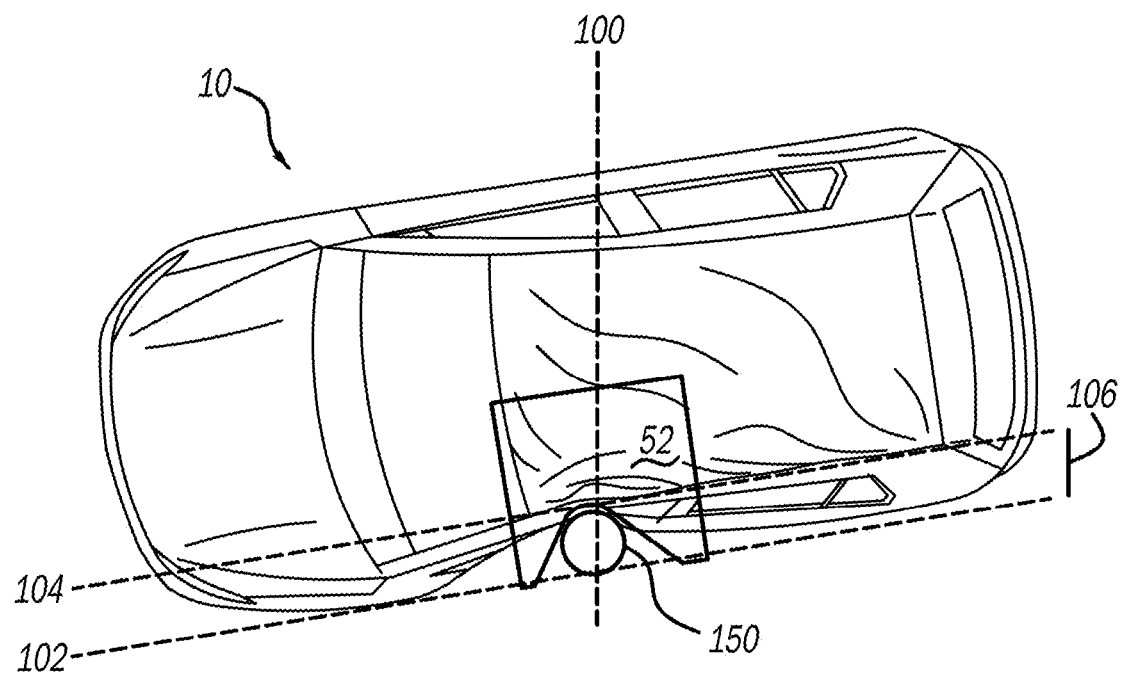
FIG. 6 illustrates a plan view of a vehicle undergoing a crash test.

Table 1 illustrates the peak displacement and fixed-force displacement of a comparative example (i.e., vehicle without a carrier) and an inventive example (i.e., vehicle with a carrier of the present disclosure). Measurements were conducted with CAE models for a vehicle traveling at a crash object (i.e., an oblique pole (at an angle of about 75°) at a velocity of 32 km/h and the point of impact was adjacent the forward, driver-side passenger compartment and directed toward the center of the battery tray, as shown in FIG. 2. The inventive example and comparative example vehicles were similarly structured, the structure corresponding to the diagram shown in FIG. 2. A plan view of a vehicle undergoing a crash test is shown in FIG. 6.

TABLE 1

| | Peak Displacement (mm) | Fixed-Force Displacement (mm, @ 0.6 kN) |
|---|---|---|
| Comparative Example | 226 | 250 |
| Inventive Example | 200 | 150 |
| % Reduction | 11.5 | 40 |

FIG. 1 illustrates a perspective view of a frame 20. The frame 20 includes a left side 12A, oriented away from the viewer, and a right side 12B, oriented toward the viewer. The frame 20 includes a forward end 14A and a rearward end 14B. The frame 20 includes a sill 24, a front apron 34 adjacent to the sill 24, and a quarter panel 36 adjacent to the sill 24. The front apron 34 defines a forward wheel well 28A and the quarter panel 36 defines a rearward wheel well 28B. The sill 24 extends horizontally between the forward wheel well 28A and the rearward wheel well 28B. The frame 20 includes an A-pillar 26A, a B-pillar 26B, and a C-pillar 26C. The A-pillar 26A extends at an angle to and upward from the front apron 34, the B-pillar 26B extends upward, horizontally from the sill 24, and the C-pillar 26C extends at an angle to and upward from the quarter panel 36. The frame further includes a floor pan 30. The frame 20 defines a frame enclosure 50.

FIG. 2 illustrates a plan view of a passenger compartment 52 which is a portion of a frame enclosure 50 that is located on the left side 12A of the frame 20 and adjacent the forward wheel well (not shown). The passenger compartment 52 includes a battery tray 54 and a floor pan 30. The battery tray 54 includes six battery cross-members 56 employed at regular intervals within the battery tray 54. A cross-member 32 spans the floor pan 30, extending from the left side 12A to the right side (not shown), and forms a perpendicular intersection with a sill 24. The sill 24 extends adjacent the battery tray 54 and the floor pan 30). A rocker 22 is affixed to and spans the length of the sill 24. A location of a crash object 150 according to the crash test as described herein is shown.

FIG. 3 illustrates a perspective, sectional view of a carrier 60. The carrier 60 includes periphery 62. A cut-away of one of the periphery 62 exposes ribs 64 including a first series of ribs 64A and a second series of ribs 64B. The ribs 64 are arranged in a transverse orientation 80B. Line A-A indicates a longitudinal cross-section. Line B-B indicates a transverse cross-section.

FIGS. 4A-4F illustrate a perspective view of a carrier 60. The carrier 60 comprises an outer edge 62A, an inner edge 62B, a top edge 62C, a bottom edge 62D, and ribs 64. The outer edge 62A is configured to face away from the frame enclosure (not shown) and the inner edge 62B is configured to face toward the frame enclosure (not shown).

Figure 4A:
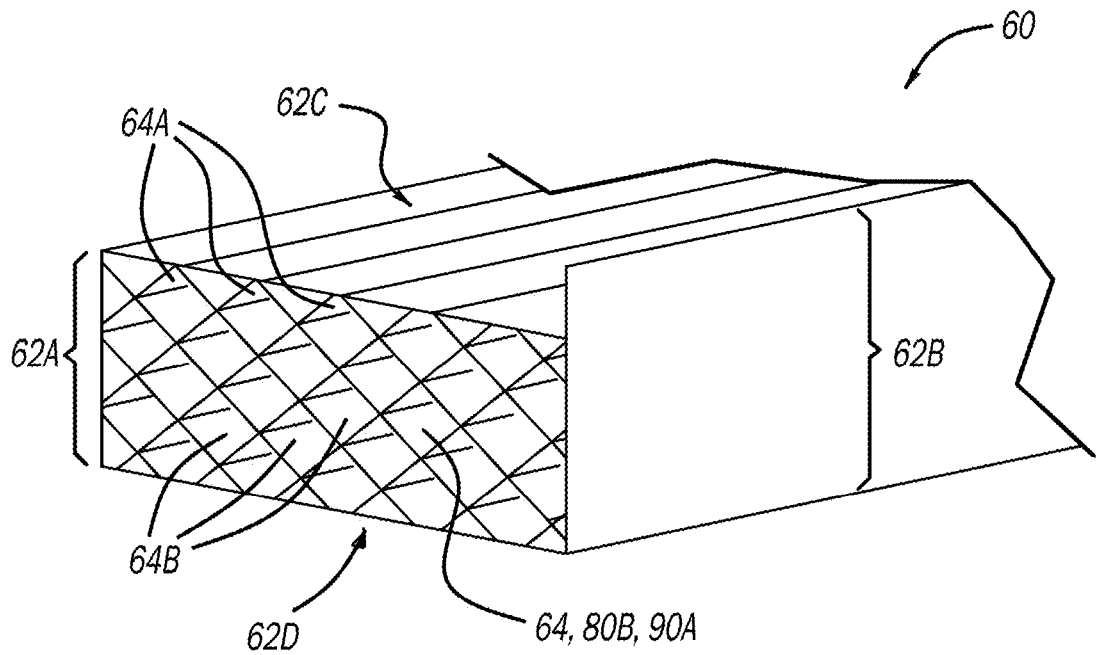
FIG. 4A illustrates a perspective view of a carrier.

In FIG. 4A, the ribs 64 include a first series of ribs 64A, at a bias from the outer edge 62A and inner edge 62B, and a second series of ribs 64B, at a bias from the outer edge 62A and inner edge 62B. The first series of ribs 64A are arranged in parallel to one another and the second series of ribs 64B are arranged in parallel to one another. The ribs 64 exhibit a transverse orientation 80B and a biased pattern 90A. The biased pattern 90A is observable from an orthographic projection of a transverse cross-section of the carrier 60, which connotes a transverse orientation 80B. In other words, the ribs 64 generally extend along a direction parallel to the longitudinal axis of the carrier 60.

Figure 4B:
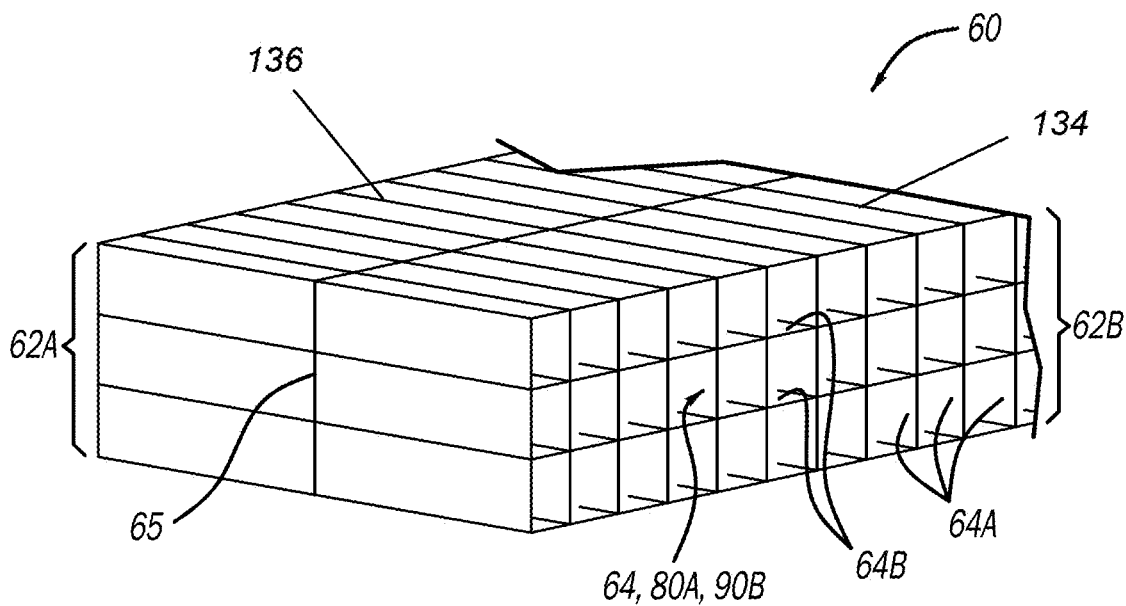
FIG. 4B illustrates a perspective view of a carrier.

In FIG. 4B, the carrier 60 includes a first portion 134 and second portion 136. The first portion 134 and second portion 136 are joined at region which is an extra rib 65 which bisects the carrier 60. The ribs 64 include a first series of ribs 64A and a second series of ribs 64B. The second series of ribs 64B are transverse to the outer edge 62A and inner edge 62B. The second series of ribs 64B are parallel to the bottom edge 62D and top edge 62C. The first series of ribs 64A are transverse to the outer edge 62A and inner edge 62B. The first series of ribs 64A are transverse to the second series of ribs 64B. The first series of ribs 64A are arranged parallel to one another while the second series of ribs 64B are arranged parallel to one another. The ribs 64 exhibit a rectangular pattern 90B. The ribs 64 exhibit a longitudinal orientation 80A. The rectangular pattern 90B is observable from an orthographic projection of a longitudinal cross-section of the carrier 60, which connotes a longitudinal orientation 80A. In other words, the ribs 64 generally project in a direction orthogonal or transverse to the longitudinal axis of the carrier 60.

Figure 4C:
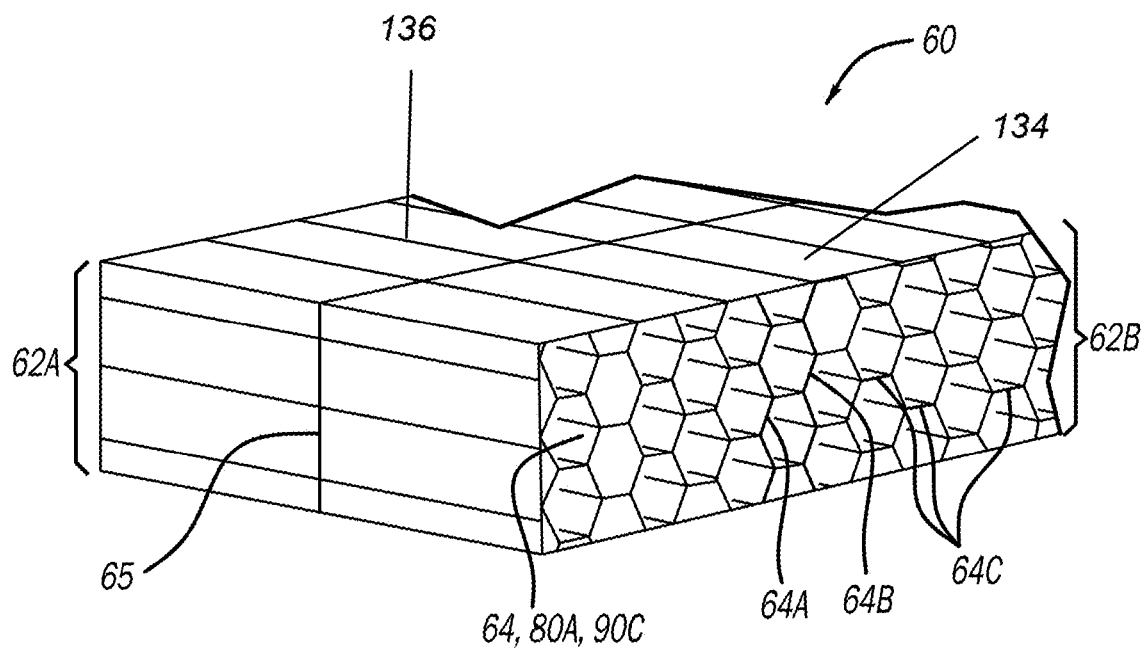
FIG. 4C illustrates a perspective view of a carrier.

In FIG. 4C, the carrier 60 includes a first portion 134 and second portion 136. The first portion 134 and second portion 136 are joined at region 65. The ribs 64 include a first series of ribs 64A, a second series of ribs 64B, and third series of ribs 64C. The ribs 64 are all transverse to the inner edge 62A and outer edge 62B. The ribs 64 exhibit a longitudinal orientation 80A. In other words, the ribs 64 are arranged parallel to a transverse cross-section B-B of the carrier 60. The ribs 64 generally project in a direction orthogonal or transverse to the longitudinal axis of the carrier 60. The ribs 64 exhibit a honeycomb pattern 90C. To form the honeycomb pattern 90C, the first series of ribs 64A have a symmetrical zigzag pattern, the second series of ribs 64B have a symmetrical zigzag patter which also has reflection symmetry with the first series of ribs 64A, and the third series of ribs 64C are parallel to the upper edge 62C and bottom edge 62D. The third series of ribs 64C extends from peaks formed by the zigzag patterns of the first series of ribs 64A and second series of ribs 64B.

Figure 4D:
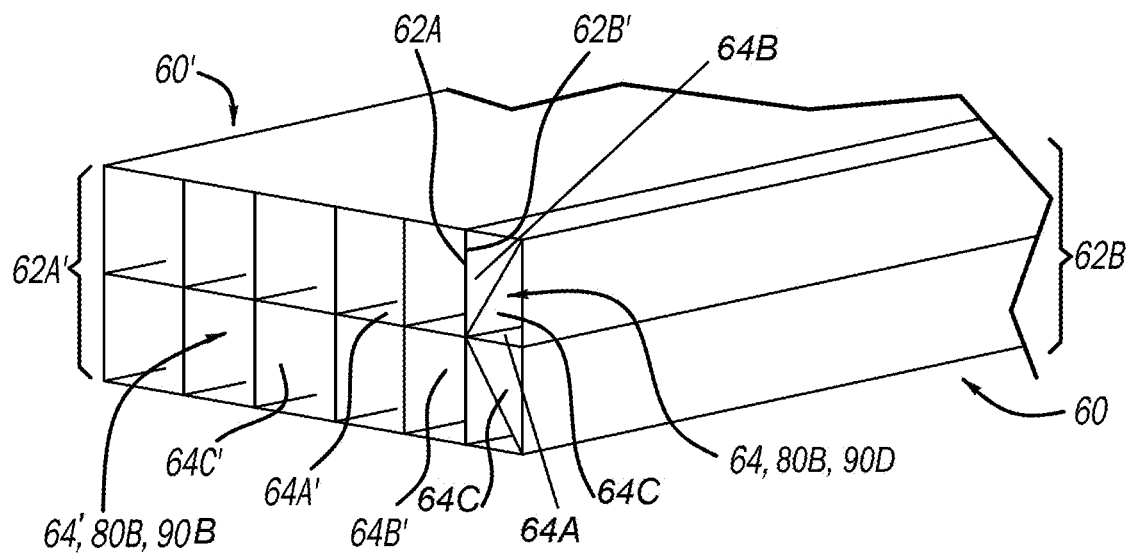
FIG. 4D illustrates a perspective view of a carrier.

In FIG. 4D, there is a carrier 60 and another adjacent carrier 60'. The carriers 60, 60' each have an outer edge 62A, 62A' and inner edge 62B, 62B'. The carriers 60, 60' each include a plurality of ribs 64, 64'. The carriers 60, 60' are joined at their respective outer edge 62B' and inner edge 62A. The ribs 64, 64' exhibit a transverse orientation 80B.

The ribs 64 of the carrier 60 exhibit a hybrid pattern 90D. The ribs 64' of the other carrier 60' exhibit a rectangular pattern 90B. To form the hybrid pattern 90D, a first series of ribs 64A and second series of ribs 64B are arranged in a rectangular pattern extending parallel with a longitudinal axis of the carrier 60 with a third series of ribs 60C, arranged at a bias from vertical. To form the rectangular pattern 90B, the first series of ribs 64A' and second series of ribs 64B are arranged parallel with the longitudinal axis of the carrier 60'.

Figure 4E:
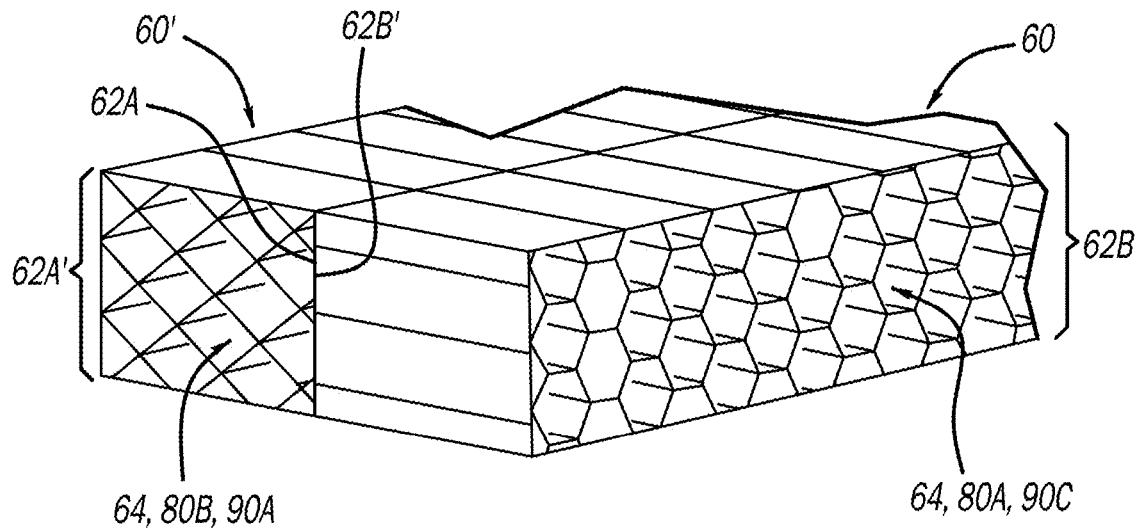
FIG. 4E illustrates a perspective view of a carrier.

In FIG. 4E, there is a carrier 60 and another carrier 60'. The carriers 60, 60' each have an outer edge 62A, 62A' and an inner edge 62B, 62B'. The carriers 60, 60' each include a plurality of ribs 64, 64'. The ribs 64 of the carrier 60 are arranged in a honeycomb pattern 90C. The ribs 64 of the carrier 60 exhibit a longitudinal orientation 80A. The ribs 64' of the other carrier 60' are arranged in a biased pattern 90A. The ribs 64' of the other carrier 60' are arranged in a transverse orientation 80B.

Figure 4F:
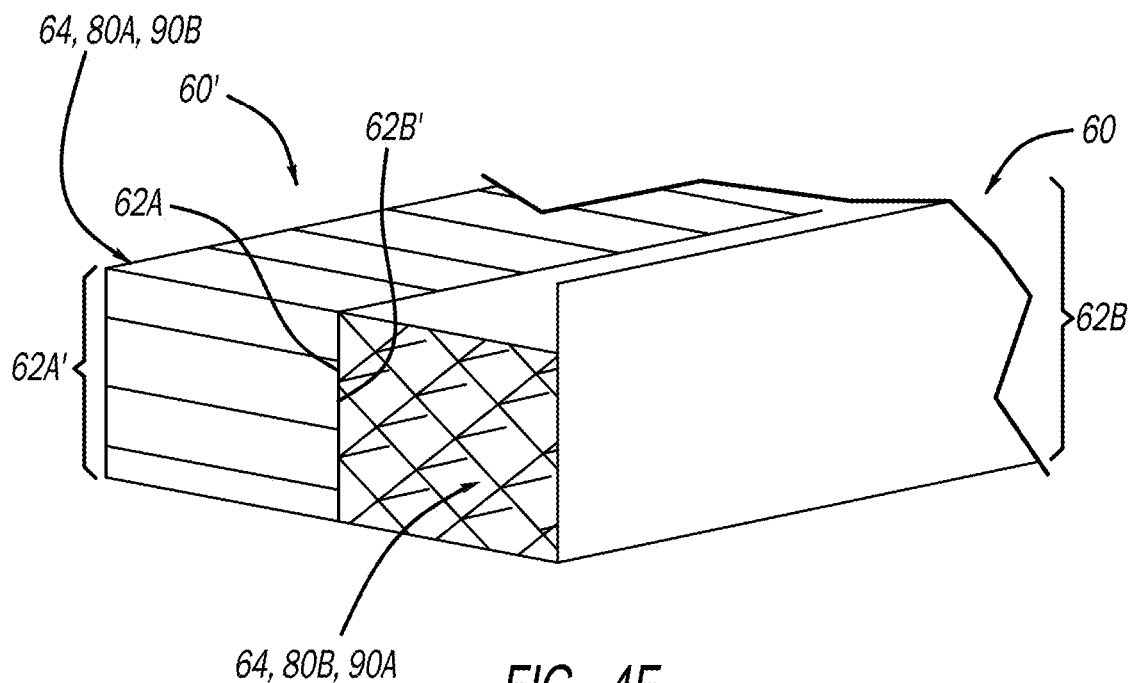
FIG. 4F illustrates a perspective view of a carrier.

In FIG. 4F, there is a carrier 60 and another carrier 60'. The carriers 60, 60' each have an outer edge 62A, 62A' and an inner edge 62B, 62B'. The carriers 60, 60' each include a plurality of ribs 64, 64'. The ribs 64 of the carrier 60 are arranged in a biased pattern 90A. The ribs 64 of the carrier 60 exhibit a transverse orientation 80B. The ribs 64' of the other carrier 60' are arranged in a rectangular pattern 90B. The ribs 64' of the other carrier 60' are arranged in a longitudinal orientation 80A.

FIGS. 5A-5F illustrate a cross-sectional view of a carrier 60 or carriers 60, 60' within a cavity 70). A rocker 22 is affixed to a sill 24 at two seams 25, 25' to form the cavity 70.

Figure 5A:
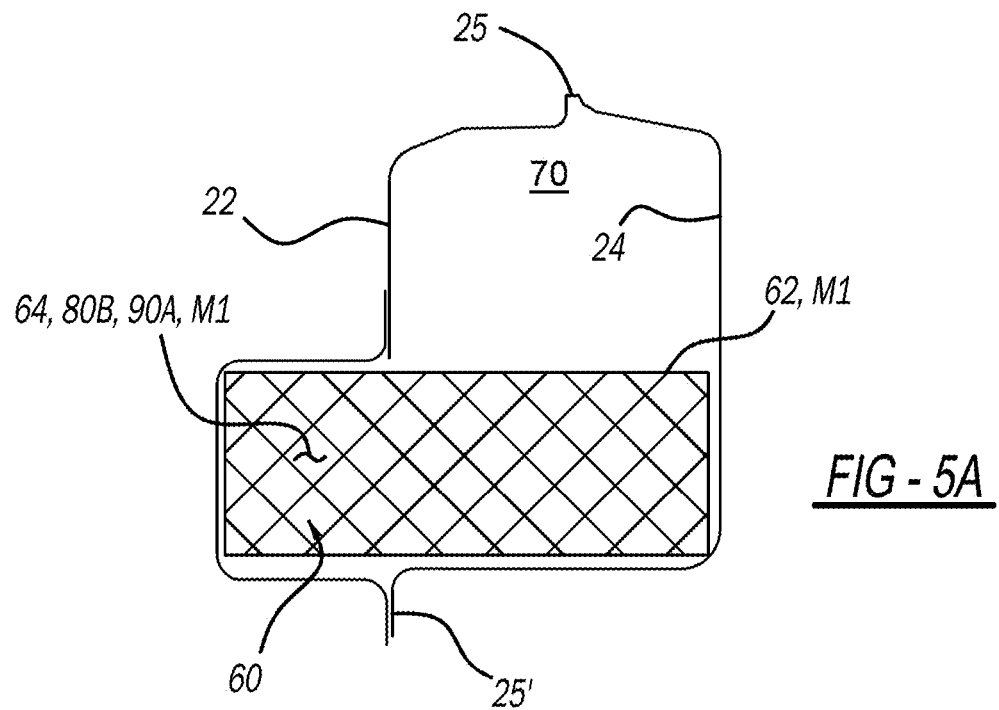
FIG. 5A illustrates a cross-sectional view of a carrier within a cavity.

In FIG. 5A, a carrier 60 is enclosed within a cavity 70. The carrier 60 includes a periphery 62. Within the periphery 62 are ribs 64. The ribs 64 exhibit a transverse orientation 80B and a biased pattern 90A. The ribs 64 and the periphery 62 comprise the same one base material M1.

Figure 5B:
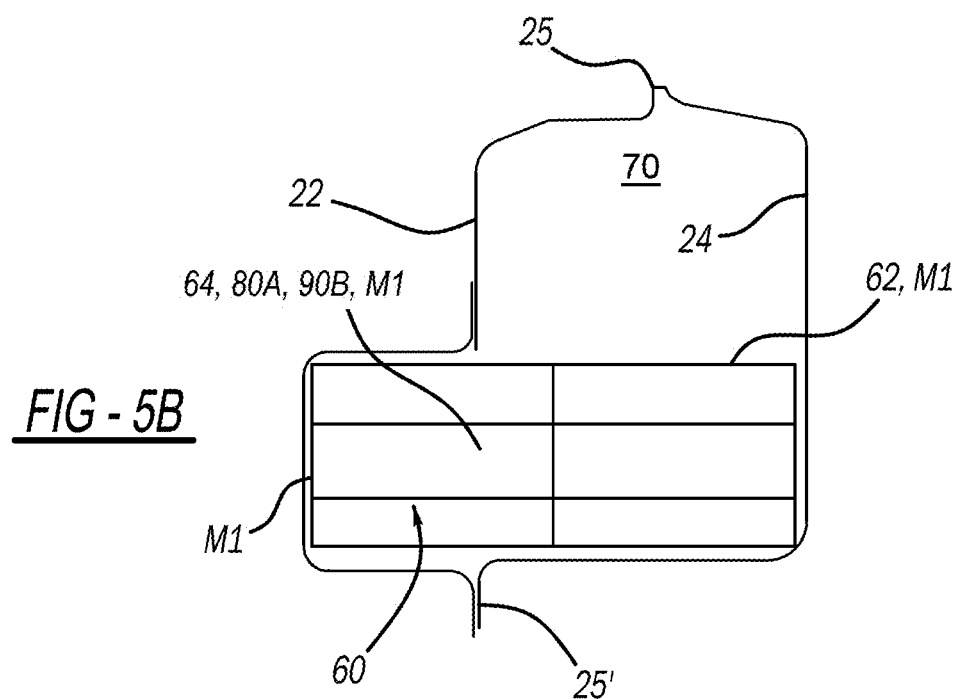
FIG. 5B illustrates a cross-sectional view of a carrier within a cavity of a rocker.

In FIG. 5B, a carrier 60 is enclosed within a cavity 70. The carrier 60 includes a first portion 134 adjacent to a second portion 136. The carrier 60 includes a periphery 62. Within the periphery 62 are ribs 64. The ribs 64 exhibit a longitudinal orientation 80A and a rectangular pattern 90B. The ribs 64 and the periphery 62 comprise the same one base material M1.

Figure 5C:
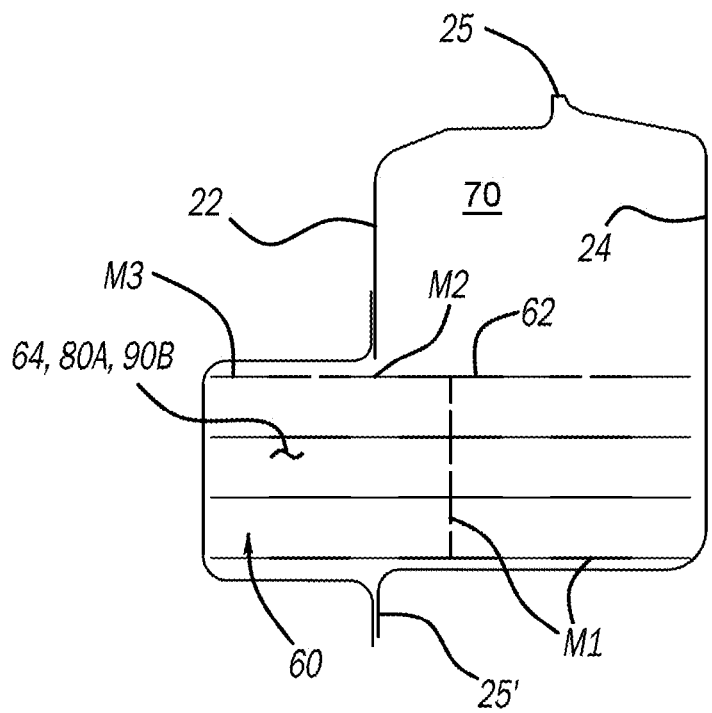
FIG. 5C illustrates a cross-sectional view of a carrier within a cavity of a rocker.

In FIG. 5C, a carrier 60 is enclosed within a cavity 70. The carrier 60 includes a first portion 134 adjacent to a second portion 136. The carrier 60 includes a periphery 62. Within the periphery 62 are ribs 64. The ribs 64 exhibit a longitudinal orientation 80A and a rectangular pattern 90B. The ribs 64 and the periphery 62 comprise three difference base materials M1, M2, and M3.

Figure 5D:
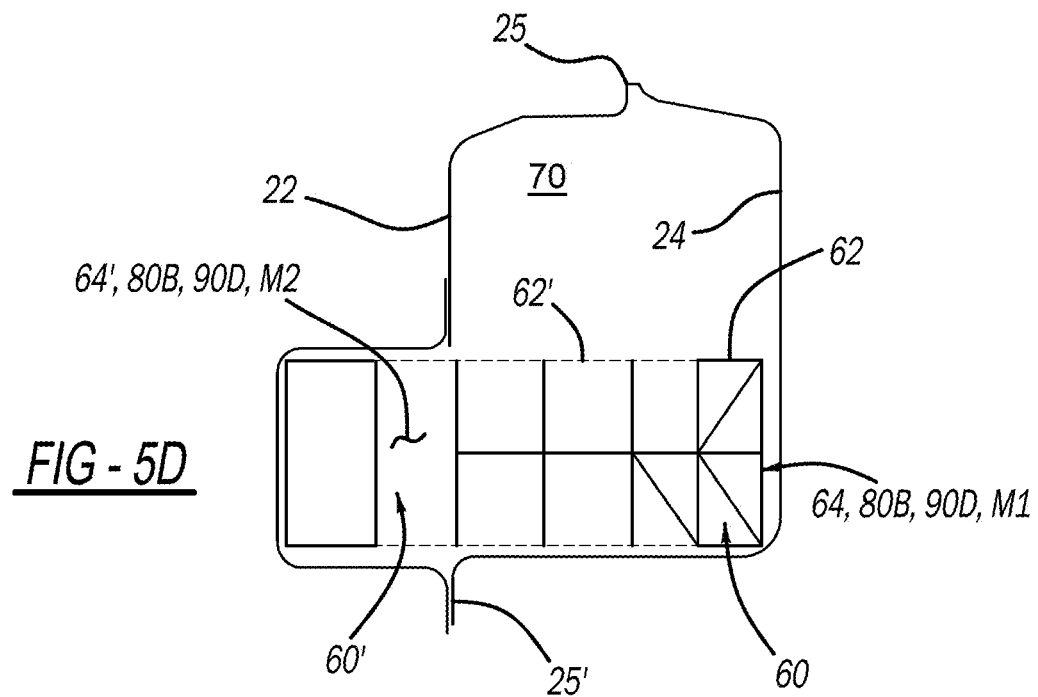
FIG. 5D illustrates a cross-sectional view of a carrier within a cavity of a rocker.
Figure 5E:
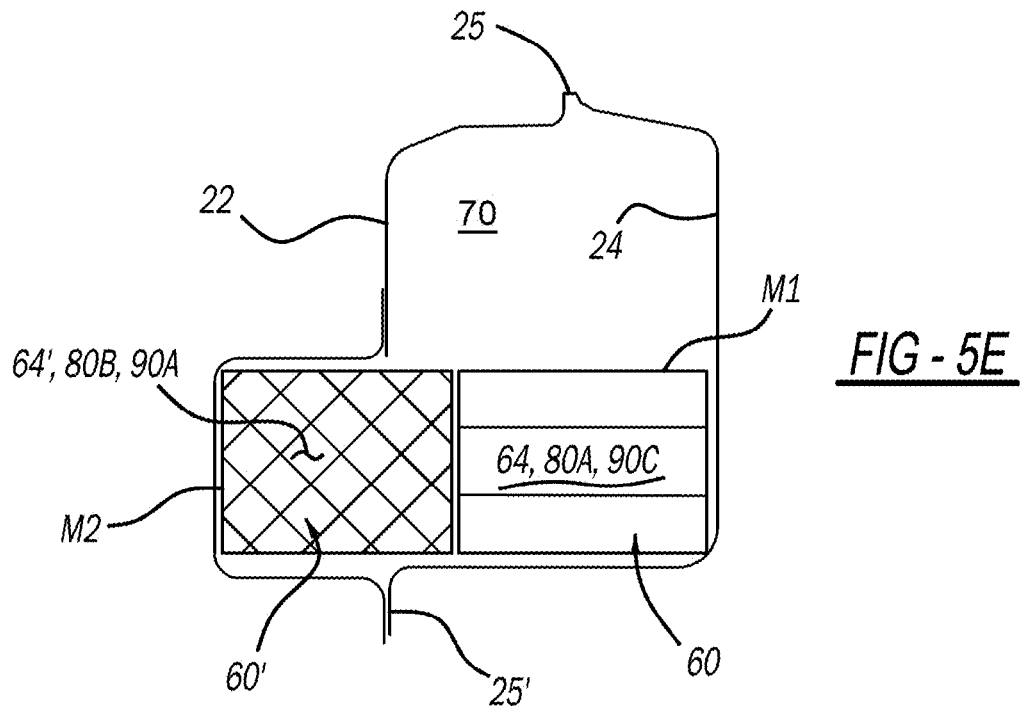
FIG. 5E illustrates a cross-sectional view of a carrier within a cavity of a rocker.

In FIG. 5D, two carriers 60, 60' are enclosed within a cavity 70. The carriers 60, 60' includes a periphery 62, 62'. Within the periphery 62, 62' are ribs 64, 64'. The ribs 64, 64' exhibit a longitudinal orientation 80A and a hybrid pattern 90D. The ribs 64 and the periphery 62 comprise the same one base material M1. The carrier 60 comprises three different base materials, a first base material M1, a second base material M2, and a third base material M3. In FIG. 5E, two carriers 60, 60' are enclosed within cavity 70. The carriers 60, 60' both include a plurality of ribs 64, 64'. The ribs 64 of the carrier 60 exhibit a longitudinal orientation 80A with a honeycomb pattern 90C. The ribs 64' of the other carrier 60' exhibit a transverse orientation 80B with a biased pattern 90A. The carrier 60 comprises a first base material M1 while the other carrier 60 comprises another base material M2.

Figure 5F:
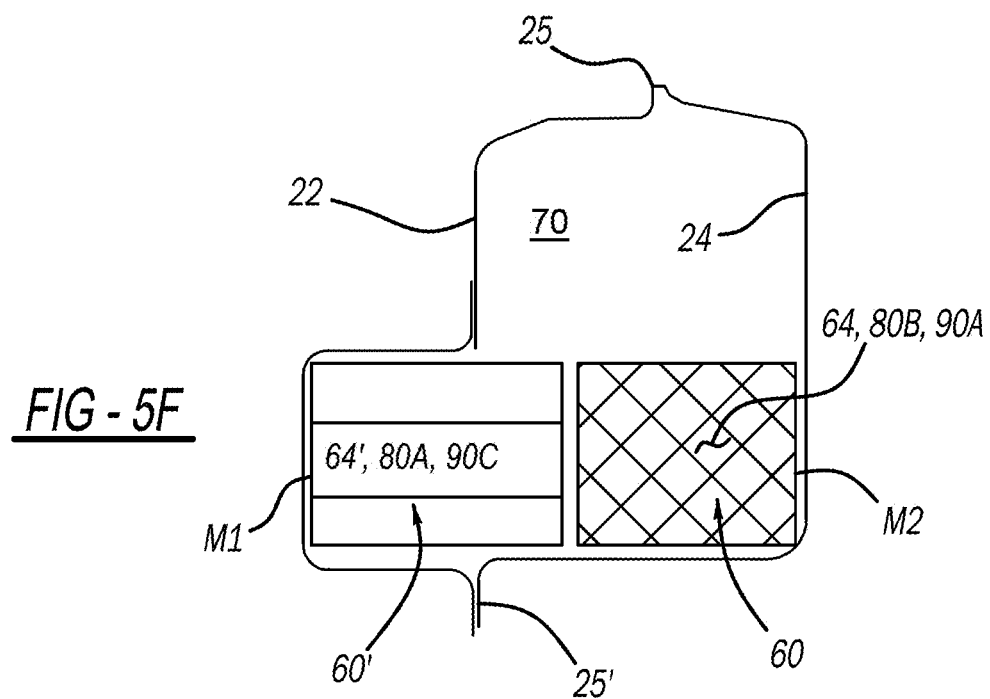
FIG. 5F illustrates a cross-sectional view of a carrier within a cavity of a rocker.

In FIG. 5F, two carriers 60, 60' are enclosed within cavity 70. The carriers 60, 60' include a plurality of ribs 64, 64'. The ribs 64 of the carrier 60 exhibit a transverse orientation 80B with a biased pattern 90A. The ribs 64' of the carrier 60' exhibit a longitudinal orientation 80A with a honeycomb pattern 90C. The carrier 60 comprises a second base material M2 while the carrier 60' comprises a first base material M1.

FIG. 6 illustrates a plan view of a vehicle 10 undergoing a crash test in which it is impacted with a crash object 150, which is shown as a vertical pole. The vehicle 10 impacts the crash object 150 at a point adjacent the passenger compartment 52 in a direction such that a force exerted instantaneously upon impact is characterized by a vector along a force axis 100. A pre-impact plane 102 substantially aligns with an original, un-impacted frame (not shown) of the vehicle 10. A post-impact plane 104 is defined by a tangent to the point of maximum displacement of the frame (not shown) and is parallel to the pre-impact plane 102. The distance between the two planes 102, 104 is defined as the displacement 106.

Figure 7:
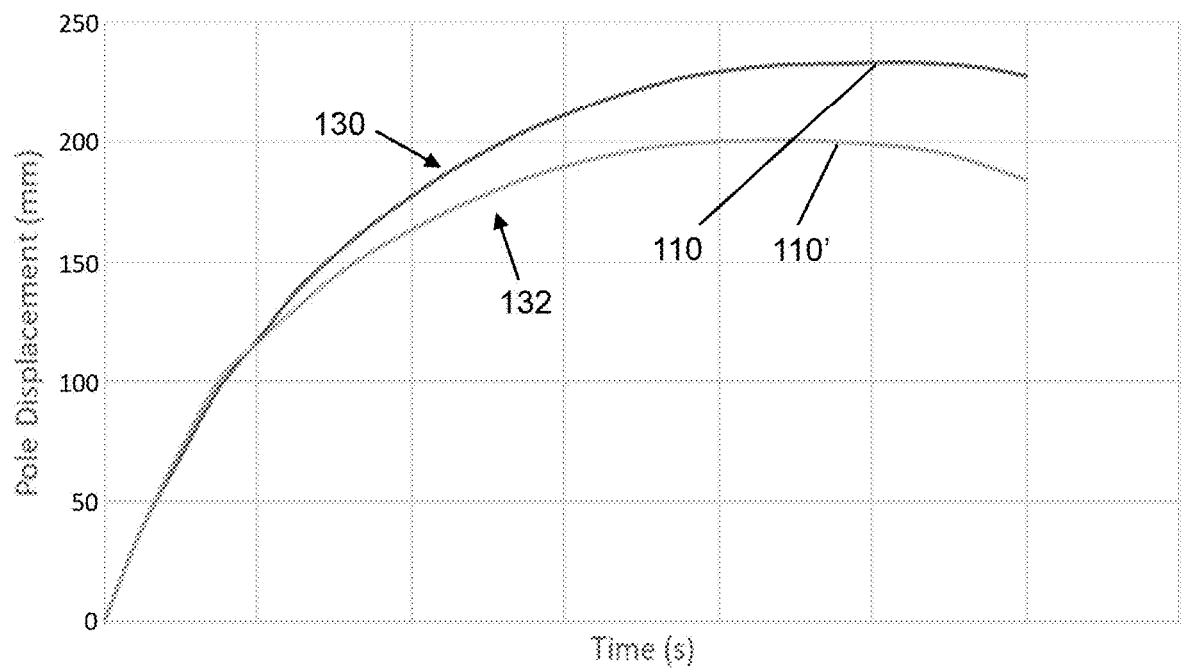
FIG. 7 illustrates graph of test data in accordance with the test depicted in FIG. 6.

FIG. 7 illustrates graph of test data in accordance with the crash test depicted in FIG. 6. A comparative example 130, a rocker not having a carrier (not shown) of the present disclosure, is shown alongside an inventive example 132, a rocker having a carrier (not shown) of the present disclosure. Each curve reaches a peak along the Y-axis, which is the peak displacement 110, 110'. The peak displacement 110 of the comparative example is larger than the peak displacement 110' of the inventive example, evidencing an improved intrusion by employing the carrier (not shown) of the present disclosure.

Figure 8:
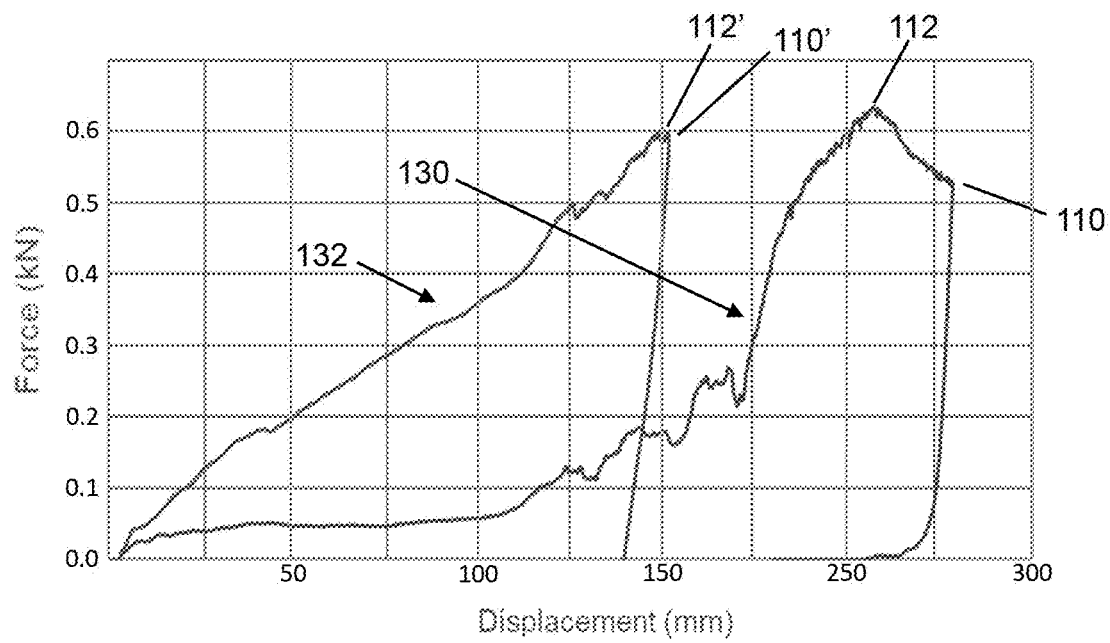
FIG. 8 illustrates a graph of test data in accordance with the test depicted in FIG. 6.

FIG. 8 illustrates a graph of test data in accordance with the crash test depicted in FIG. 6. A comparative example 130, a rocker not having a carrier (not shown) of the present disclosure, is shown alongside an inventive example 132, a rocker having a carrier (not shown) of the present disclosure. Each sample 130, 132 reaches a peak force 112, 112' and a peak displacement 110, 110'.

Figure 9:
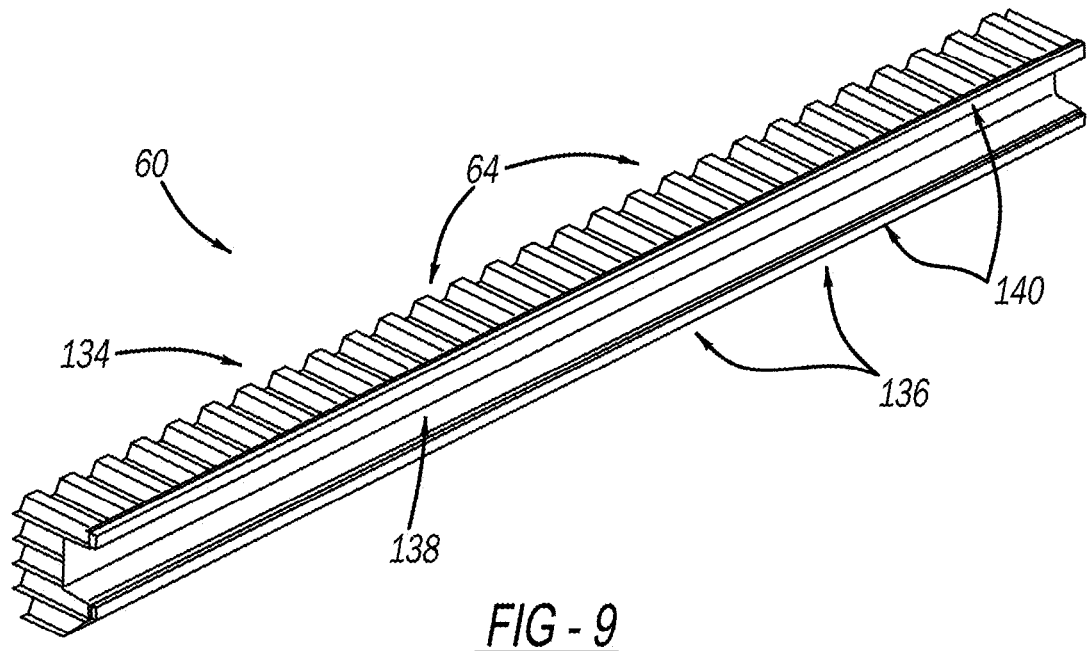
FIG. 9 is a perspective view of an exemplary carrier in accordance with the present teachings.

FIG. 9 illustrates a carrier 60. The carrier includes a plurality of transverse ribs 64. The transverse ribs are located along a first portion 134 of the carrier that comprises a first material M1 which is a polyamide (e.g., a super tough polyamide 6). The carrier 60 includes a second portion 136 of the carrier including an insert 138 formed of a polyurethane material M2 that is dissimilar from the material M1 of the first portion 134 of the carrier. An adhesive 140 is located along an edge portion 142 of the insert 138. The insert 138 is pultruded and the first portion of the carrier 134 and plurality of ribs 64 are injection molded around the insert 138.

Figure 10:
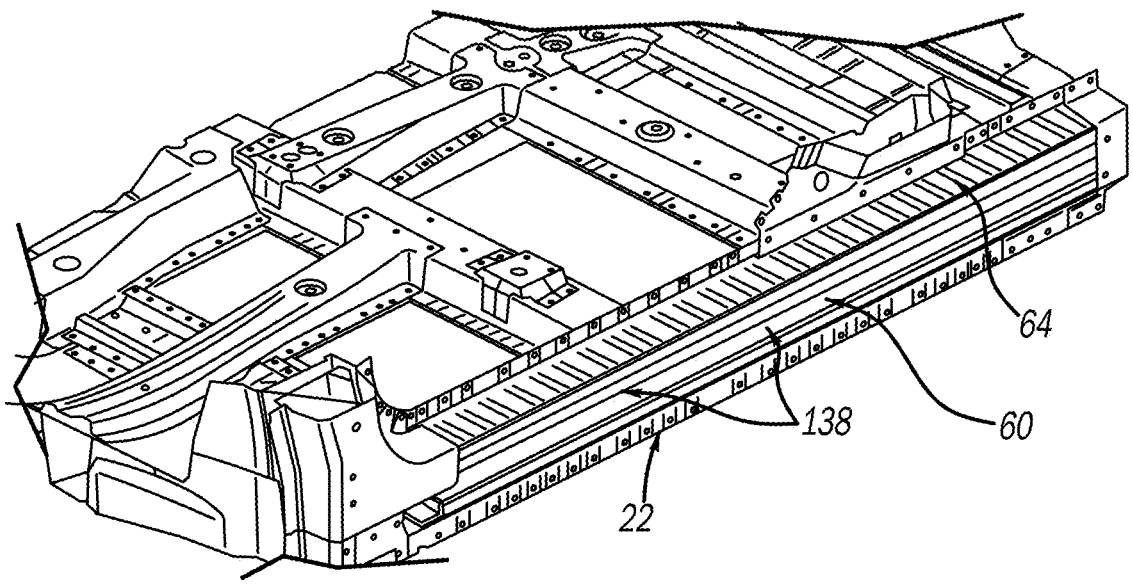
FIG. 10 is a perspective view of a vehicle body including the carrier of FIG. 9.

FIG. 10 illustrates the carrier 60 of FIG. 9 located along a rocker 22. The plurality of transverse ribs 64 extend along the length of the rocker 22. The insert 138 also extends along the length of the rocker 22.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

We claim:

1. A carrier to reinforce a frame of a vehicle comprising:
   a) a first portion having:
      i) an inner face, configured to be oriented toward a frame enclosure of the vehicle, and
      ii) a first end and a second end arranged opposite each other along a longitudinal axis of the carrier;
   b) a second portion adjacent to the first portion, the second portion having:
      i) an outer face configured to be oriented away from the frame enclosure of the vehicle, wherein the outer face is opposite and distanced from the inner face along a transverse axis, and wherein the outer face is configured to be further from the frame enclosure than the inner face;
      ii) a first end and a second end arranged opposite each other along the longitudinal axis of the carrier;
      wherein the first portion and the second portion each include a first series of ribs and a second series of ribs which form a rectangular cross-sectional pattern and extend perpendicular to the longitudinal axis;
      wherein in both the first portion and the second portion, the first series of ribs has a vertical orientation, and the second series of ribs has a horizontal orientation perpendicular to the vertical orientation;
      wherein in both the first portion and the second portion, the rectangular cross-sectional pattern forms a plurality of rectangles aligned to form a plurality of rows and a plurality of columns;
      wherein in the first portion, the first series of ribs and the second series of ribs are located within a periphery of the first portion defined as between the first end and the second end and the inner face of the first portion;
      wherein in the second portion, the first series of ribs and the second series of ribs are located within a periphery of the second portion defined as between the first end and the second end and the outer face of the second portion, and wherein the rectangular cross-sectional pattern of both the first portion and the second portion spans an entirety of a length of the first portion and the second portion, respectively.

2. The carrier of claim 1, wherein the first portion and the second portion are joined at a region which includes an extra rib which is perpendicular to the first series of ribs and the second series of ribs, and which extends parallel to the longitudinal axis of the carrier.

3. The carrier of claim 2, wherein the extra rib bisects the carrier.

4. The carrier of claim 1, wherein the first portion and the second portion are formed as a single unitary construction or the first portion is mechanical or adhesive fastened to the second portion.

5. The carrier of claim 1, wherein the carrier is employed on the frame of the vehicle.

6. The carrier of claim 5, wherein the carrier is located between a rocker and a sill of the frame of the vehicle.

7. The carrier of claim 6, wherein the sill extends adjacent to a battery tray and a floor pan of the frame, wherein the battery tray is configured to secure a battery to the vehicle, and the carrier is configured to reinforce the battery tray.

8. The carrier of claim 1, wherein the carrier comprises one or more base materials, one or more reinforcing materials, one or more additives, or any combination thereof.

9. The carrier of claim 8, wherein the carrier comprises the one or more base materials and the one or more base materials includes a polymer, a metal, or both.

10. The carrier of claim 9, wherein the one or more base materials includes the polymer and the polymer includes polyamide, polyvinyl chloride polyetherimide, polycarbonate, poly(methyl methacrylate), acrylonitrile butadiene styrene, polyetherketoneketone, polyaryletherketone, polyether ether ketone, polyphenylene sulfide, polyethylene terephthalate, polypropylene, polyethylene, or any combination thereof.

11. The carrier of claim 9, wherein the one or more base materials includes the metal and the metal includes aluminum, steel, brass, magnesium, zinc, titanium, or any combination thereof.

12. The carrier of claim 8, wherein the one or more base materials are the same for the first portion and the second portion.

13. A vehicle comprising:
a) a frame having a rocker, a sill, and a floor pan; wherein the sill extends adjacent to the floor pan;
b) a battery tray attached to or part of the frame and configured to secure a battery within the vehicle, wherein the sill also extends adjacent to the battery tray;
c) a carrier configured to reinforce the frame and the battery tray of the vehicle, the carrier comprising:
i) a first portion having:
i-a) an inner face, configured to be oriented toward a frame enclosure of the vehicle, and
i-b a first end and a second end arranged opposite each other along a longitudinal axis of the carrier;
ii) a second portion adjacent to the first portion, the second portion having:
ii-a) an outer face configured to be oriented away from the frame enclosure of the vehicle, wherein the outer face is opposite and distanced from the inner face along a transverse axis, and wherein the outer face is configured to be further from the frame enclosure than the inner face;
ii-b) a first end and a second end arranged opposite each other along the longitudinal axis of the carrier;
wherein the first portion and the second portion each include a first series of ribs and a second series of ribs which form a rectangular cross-sectional pattern and extend perpendicular to the longitudinal axis;
wherein in both the first portion and the second portion, the rectangular cross-sectional pattern forms a plurality of rectangles aligned to form a plurality of rows and a plurality of columns; and
wherein the rectangular cross-sectional pattern of both the first portion and the second portion spans an entirety of a length of the first portion and the second portion, respectively, wherein the length is a distance between the first end and the second end of each of the first portion and the second portion.

14. A vehicle having:
a) a frame having a rocker, a sill, and a floor pan; wherein the sill extends adjacent to the floor pan;
b) a battery tray attached to or part of the frame and configured to secure a battery within the vehicle, wherein the sill also extends adjacent to the battery tray;
c) a carrier configured to reinforce the frame and the battery tray of the vehicle, the carrier comprising:
iii) a first portion having:
iii-a) an inner face, configured to be oriented toward a frame enclosure of the vehicle, and
iii-b) a first end and a second end arranged opposite each other along a longitudinal axis of the carrier;
iv) a second portion adjacent to the first portion, the second portion having:
iv-a) an outer face configured to be oriented away from the frame enclosure of the vehicle, wherein the outer face is opposite and distanced from the inner face along a transverse axis, and wherein the outer face is configured to be further from the frame enclosure than the inner face;
iv-b) a first end and a second end arranged opposite each other along the longitudinal axis of the carrier;
wherein the first portion and the second portion each include a first series of ribs and a second series of ribs which form a rectangular cross-sectional pattern and extend perpendicular to the longitudinal axis;
wherein in both the first portion and the second portion, the rectangular cross-sectional pattern forms a plurality of rectangles aligned to form a plurality of rows and a plurality of columns;
wherein the rectangular cross-sectional pattern of both the first portion and the second portion spans an entirety of a length of the first portion and the second portion, respectively, wherein the length is a distance between the first end and the second end of each of the first portion and the second portion; and
wherein the carrier comprises one or more base materials which include one or more polymers, and the one or more polymers include polyamide, polyvinyl chloride polyetherimide, polycarbonate, poly(methyl methacrylate), acrylonitrile butadiene styrene, polyetherketoneketone, polyaryletherketone, polyether ether ketone, polyphenylene sulfide, polyethylene terephthalate, polypropylene, polyethylene, or any combination thereof.

15. The vehicle of claim 14, wherein the first portion and the second portion are joined at a region which includes an extra rib which is perpendicular to the first series of ribs and the second series of ribs, and which extends parallel to the longitudinal axis of the carrier.

16. The vehicle of claim 15, wherein the extra rib bisects the carrier.

17. The vehicle of claim 13, wherein the carrier comprises one or more base materials which include a polymer; and wherein the polymer includes polyamide, polyvinyl chloride polyetherimide, polycarbonate, poly(methyl methacrylate), acrylonitrile butadiene styrene, polyetherketoneketone, polyaryletherketone, polyether ether ketone, polyphenylene sulfide, polyethylene terephthalate, polypropylene, polyethylene, or any combination thereof.

18. The vehicle of claim 17, wherein the carrier comprises one or more additives, and the one or more additives include one or more blowing agents, one or more blowing accelerators, one or more curing agents, one or more curing accelerators, one or more fillers, one or more pigments, or any combination thereof.

19. The vehicle of claim 16, wherein the carrier comprises one or more additives, and the one or more additives include one or more blowing agents, one or more blowing accelerators, one or more curing agents, one or more curing accelerators, one or more fillers, one or more pigments, or any combination thereof.

* * * * *